US012596167B2

(12) United States Patent (10) Patent No.: US 12,596,167 B2
Manolakos et al. (45) Date of Patent: Apr. 7, 2026

(54) UE POSITIONING SIGNAL TRANSMISSION DURING UNCONNECTED OR INACTIVE STATE

(71) Applicant: QUALCOMM Incorporated, San Diego, CA (US)

(72) Inventors: Alexandros Manolakos, Escondido, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 711 days.

(21) Appl. No.: 17/773,905

(22) PCT Filed: Dec. 9, 2020

(86) PCT No.: PCT/US2020/064008
§ 371 (c)(1),
(2) Date: May 3, 2022

(87) PCT Pub. No.: WO2021/119127
PCT Pub. Date: Jun. 17, 2021

(65) Prior Publication Data
US 2023/0035967 A1 Feb. 2, 2023

(30) Foreign Application Priority Data

Dec. 12, 2019 (GR) .............................. 20190100553

(51) Int. Cl.
*G01S 5/00* (2006.01)
*H04L 5/00* (2006.01)
(Continued)

(52) U.S. Cl.
CPC .......... *G01S 5/0063* (2013.01); *H04L 5/0051* (2013.01); *H04L 27/2605* (2013.01); *H04W 76/28* (2018.02)

(58) Field of Classification Search
CPC .... G01S 5/0063; G01S 5/0205; G01S 5/0226; H04L 5/0051; H04L 27/2605;
(Continued)

(56) References Cited

U.S. PATENT DOCUMENTS

2010/0317343 A1* 12/2010 Krishnamurthy ... H04W 72/044
455/435.1
2013/0044713 A1* 2/2013 Suh ........................ H04L 5/0048
370/329
(Continued)

FOREIGN PATENT DOCUMENTS

CN 103797871 A 5/2014
CN 105939187 A 9/2016
(Continued)

OTHER PUBLICATIONS

Intel Corporation: "Use of Extended DRX in RRC Inactive State", 3GPP TSG RAN WG2 Meeting #108, R2-1914857 ( Revision of R2-1912861), Reno, USA, Nov. 18-22, 2019, 4 Pages.
(Continued)

*Primary Examiner* — Kiet Tang
(74) *Attorney, Agent, or Firm* — SUNSTEIN LLP

(57) ABSTRACT

A method of transmitting a sounding reference signal (SRS) for positioning includes: obtaining, at a user equipment (UE), a plurality of SRS transmission parameters; and transmitting SRS for positioning from the UE in accordance with the plurality of SRS transmission parameters while the UE is in an unconnected state, relative to a communication network, or an inactive state.

33 Claims, 10 Drawing Sheets

700

Obtaining, at a UE, a plurality of SRS transmission parameters 711

Transmitting an SRS for positioning from the UE in accordance with the plurality of SRS transmission parameters while the UE is in an unconnected state, relative to a communication network, or an inactive state 712

(51) Int. Cl.
 *H04L 27/26*   (2006.01)
 *H04W 76/28*   (2018.01)

(58) Field of Classification Search
 CPC .... H04L 5/0048; H04W 76/28; H04W 64/00;
                H04W 24/08
 See application file for complete search history.

(56)     References Cited

U.S. PATENT DOCUMENTS

| | | | | |
|---|---|---|---|---|
| 2013/0083683 A1* | 4/2013 | Hwang | ................. | H04W 64/00 |
| | | | | 370/252 |
| 2016/0338050 A1 | 11/2016 | Kim et al. | | |
| 2017/0202025 A1* | 7/2017 | Ouchi | ............... | H04W 74/0833 |
| 2018/0007576 A1* | 1/2018 | Lee | ....................... | H04L 5/0035 |
| 2018/0227094 A1* | 8/2018 | Liu | .................... | H04B 7/06966 |
| 2018/0352561 A1 | 12/2018 | Barabell et al. | | |
| 2019/0245649 A1* | 8/2019 | Siomina | ................ | H04L 1/0026 |
| 2022/0026517 A1* | 1/2022 | Hasegawa | ............. | G01S 5/0236 |

FOREIGN PATENT DOCUMENTS

| | | | |
|---|---|---|---|
| WO | 2015176296 A1 | 11/2015 | |
| WO | 2016048509 A1 | 3/2016 | |
| WO | 2017166234 A1 | 10/2017 | |
| WO | 2020168573 A1 | 8/2020 | |
| WO | 2020168576 A1 | 8/2020 | |

OTHER PUBLICATIONS

Nokia., et al., "Views on Physical Layer Procedures for NR Positioning", 3GPP TSG RAN WG1 #96bis, R1-1905264, Phy Procedures, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 2, 2019, XP051707401, 6 Pages, the whole document.

Ericsson: "Offline discussion summary for 7.2.10.2 UL Reference Signals for NR Positioning", 3GPP TSG RAN WG1 Meeting #97, R1-1907765, Reno, NV, USA, May 13-17, 2019, pp. 1-17, Chapters 2.2, 2.3.1, 2.3.2, 2.3.4, 2.3.5, 3.1, 3.2 and 3.3.1.

Taiwan Search Report—TW109143629—TIPO—Oct. 1, 2024.

Vivo: "Views on NR DL&UL positioning techniques", 3GPP TSG RAN WG1#96 Meeting, R1-1901716, Athens, Greece Feb. 25-Mar. 1, 2019, 5 Pages, Chapters 2 and 3.2.

International Search Report and Written Opinion—PCT/US2020/064008—ISA/EPO—Mar. 18, 2021.

Nokia: "Introduction of NR Positioning Support", 3GPP Draft, 3GPP TSG-RAN Meeting #86, RP-192643, 3rd Generation Partnership Project (3GPP), Mobile Competence Centre, 650, Route Deslucioles, F-06921 Sophia-Antipolis Cedex, France, vol. RAN WG1, No. Reno, USA, Nov. 18, 2019-Nov. 22, 2019 Dec. 7, 2019 (Dec. 7, 2019), XP051838489, 1 Page, Retrieved from the Internet: URL:https://ftp.3gpp.org/tsg_ran/TSG_RAN/TSGR_86/Docs/RP-192643.zip 38214_CR0057_(Rel-16) R1-1913662.docx [retrieved on Dec. 7, 2019] the whole document.

MVO. "Views on NR DL&UL Positioning Techniques", 3GPP Draft, 3GPP TSG RAN WG1#96 Meeting, R1-1901716 Views on NR DL&UL Positioning Techniques, 3RD Generation Partnership Project (3GPP), Mobile Competence Centre, 650, Route Des Lucioles, F-06921 Sophia-Antipolis Cedex, France, vol. Ran WG1, No. Athens, Greece, Feb. 25, 2019-Mar. 1, 2019 Feb. 16, 2019 (Feb. 16, 2019), XP051599412, 5 Pages, Retrieved from the Internet: URL: http://www.3gpp.org/ftp/tsg%5Fran/WG1%5FRL1/TSGR1%5F96/Docs/R1%2D1901716%2Ezip [retrieved on Feb. 16, 2019] pp. 2, 4.

* cited by examiner

700

Obtaining, at a UE, a plurality of SRS transmission parameters — 711

Transmitting an SRS for positioning from the UE in accordance with the plurality of SRS transmission parameters while the UE is in an unconnected state, relative to a communication network, or an inactive state — 712

| SRS config index | Tx power | Sequence | Timing advance | Guard | Comb number | Symbols/ resource | Resource mapping | Stagger |
|---|---|---|---|---|---|---|---|---|
| 8 | Tx-8 | S-8 | T-8 | G-8 | N-8 | S/R-8 | RM-8 | St-8 |
| 12 | Tx-12 | S-12 | T-12 | G-12 | N-12 | S/R-12 | RM-12 | St-12 |

| Slot index | Symbol index | Duration | Group hopping | Sequence hopping | Scrambling ID | BW | Ref. freq. | Start PRB | Freq hopping | Periodicity | Tx beam |
|---|---|---|---|---|---|---|---|---|---|---|---|
| SI-8 | Sy-8 | D-8 | GH-8 | SH-8 | ID-8 | BW-8 | RF-8 | SP-8 | FH-8 | Per-8 | Tb-8 |
| SI-12 | Sy-12 | D-12 | SH-12 | SH-12 | ID-12 | BW-12 | RF-12 | SP-12 | FH-12 | Per-12 | Tb-12 |

UE POSITIONING SIGNAL TRANSMISSION DURING UNCONNECTED OR INACTIVE STATE

CROSS-REFERENCE TO RELATED APPLICATIONS

This application is the National Stage of International Application No. PCT/US2020/064008, filed Dec. 9, 2020, entitled "UE POSITIONING SIGNAL TRANSMISSION DURING UNCONNECTED OR INACTIVE STATE," which claims the benefit of Greek patent application No. 20190100553, filed Dec. 12, 2019, entitled "UNCONNECTED UE POSITIONING SIGNAL TRANSMISSION," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., LTE (Long Term Evolution) or WiMax), a fifth-generation (5G), service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example method of transmitting a sounding reference signal (SRS) for positioning includes: obtaining, at a user equipment (UE), a plurality of SRS transmission parameters; and transmitting SRS for positioning from the UE in accordance with the plurality of SRS transmission parameters while the UE is in an unconnected state, relative to a communication network, or an inactive state.

Implementations of such a method may include one or more of the following features. The method includes receiving an indication from the communication network by the UE triggering the transmitting of the SRS for positioning from the UE. The unconnected state includes a Radio Resource Control (RRC) idle mode or an RRC inactive mode, and the inactive state includes a discontinuous reception (DRX) inactive mode. The plurality of SRS transmission parameters includes a transmission beam, or a pilot sequence, or a physical resource mapping, or a timing advance, or a first guard time before transmitting of the SRS for positioning, or a second guard time after transmitting of the SRS for positioning, or a combination of two or more thereof. Obtaining the plurality of SRS transmission parameters includes receiving one or more configuration parameters, for transmission of sounding reference signals, from the communication network in response to a request from the UE. Obtaining the plurality of SRS transmission parameters includes receiving one or more configuration parameters, for transmission of sounding reference signals, from the communication network while the UE is in the unconnected state relative to the communication network. Obtaining the plurality of SRS transmission parameters includes receiving the one or more configuration parameters from the communication network in a broadcast system information block (SIB) message that also contains downlink positioning reference signal (DL-PRS) information. Obtaining the plurality of SRS transmission parameters includes receiving the one or more configuration parameters from the communication network in a broadcast system information block (SIB) message dedicated to carrying the one or more configuration parameters.

Also or alternatively, implementations of such a method may include one or more of the following features. Obtaining the plurality of SRS transmission parameters includes determining, by the UE, at least one UE-specific configuration parameter of another SRS while the UE is connected to the communication network. Obtaining the plurality of SRS transmission parameters includes determining each of the plurality of SRS transmission parameters based on an unconnected configuration parameter received, if at all, from the communication network by the UE while the UE is in the unconnected state relative to the communication network, or based on a connected configuration parameter received while the UE is in a connected state relative to the communication network if no appropriate unconnected configuration parameter was received.

Also or alternatively, implementations of such a method may include one or more of the following features. The method includes refraining from transmitting, from the UE, any signal in a frequency band of the SRS for positioning for a first guard time before a beginning of transmission of the SRS for positioning, or for a second guard time after an end of transmission of the SRS for positioning, or a combination thereof. Transmitting the SRS for positioning includes transmitting pilot sequences on an identical set of subcarriers on consecutive OFDM (Orthogonal Frequency Division Multiplexing) symbols for more than a maximum number of consecutive OFDM symbols allowed for transmission of SRS resources for positioning during connected communication between the UE and the communication network. A beginning portion of a set of multiple consecutive symbols of the SRS for positioning is used as a cyclic prefix for a remainder portion of another set of multiple consecutive symbols of the SRS for positioning.

Also or alternatively, implementations of such a method may include one or more of the following features. Obtaining the plurality of SRS transmission parameters includes the UE randomly or pseudo-randomly selecting a pilot sequence to be used for transmitting the SRS for positioning. Transmitting the SRS for positioning includes transmitting the SRS for positioning using a transmit beam corresponding to a receive beam associated with reception of a downlink reference signal from the communication network. The downlink reference signal includes an SSB (Synchronized Signal Block) or a PRS (Positioning Reference Signal).

An example UE includes: a memory; a transceiver; and a processor communicatively coupled to the memory and the transceiver and configured to: obtain a plurality of sounding reference signal (SRS) transmission parameters; and transmit SRS for positioning from the UE in accordance with the plurality of SRS transmission parameters while the UE is in an unconnected state, relative to a communication network, or an inactive state.

Implementations of such a UE may include one or more of the following features. The processor is configured to transmit the SRS for positioning in response to receiving, via the transceiver, an indication from the communication network triggering transmitting of the SRS for positioning from the UE. The unconnected state includes a Radio Resource Control (RRC) idle mode or an RRC inactive mode, and the inactive state includes a discontinuous reception (DRX) inactive mode. The plurality of SRS transmission parameters include a transmission beam, or a pilot sequence, or a physical resource mapping, or a timing advance, or a first guard time before transmitting of the SRS for positioning, or a second guard time after transmitting of the SRS for positioning, or a combination of two or more thereof. To obtain the plurality of SRS transmission parameters the processor is configured to receive one or more configuration parameters, for transmission of sounding reference signals, from the communication network in response to a request from the UE. To obtain the plurality of SRS transmission parameters the processor is configured to receive one or more configuration parameters, for transmission of sounding reference signals, from the communication network while the UE is in the unconnected state relative to the communication network. To obtain the plurality of SRS transmission parameters the processor is configured to receive the one or more configuration parameters from the communication network in a broadcast system information block (SIB) message that also contains downlink positioning reference signal (DL-PRS) information. To obtain the plurality of SRS transmission parameters the processor is configured to receive the one or more configuration parameters from the communication network in a broadcast system information block (SIB) message dedicated to carrying the one or more configuration parameters.

Also or alternatively, implementations of such a UE may include one or more of the following features. To obtain the plurality of SRS transmission parameters the processor is configured to determine at least one UE-specific configuration parameter of another SRS while the UE is connected to the communication network. To obtain the plurality of SRS transmission parameters the processor is configured to determine each of the plurality of SRS transmission parameters based on an unconnected configuration parameter received, if at all, from the communication network by the UE while the DE is in an unconnected relative to the communication network, or based on a connected configuration parameter received while the UE is in a connected state relative to the communication network if no appropriate unconnected configuration parameter was received.

Also or alternatively, implementations of such a UE may include one or more of the following features. The processor is configured to refrain from transmitting, via the transceiver, any signal in a frequency band of the SRS for positioning for a first guard time before a beginning of transmission of the SRS for positioning, or for a second guard time after an end of transmission of the SRS for positioning, or a combination thereof. The processor is configured to transmit the SRS for positioning by transmitting pilot sequences on an identical set of subcarriers on consecutive OFDM (Orthogonal Frequency Division Multiplexing) symbols for more than a maximum number of consecutive OFDM symbols allowed for transmission of SRS resources for positioning during connected communication between the UE and the communication network. The processor is configured to use a beginning portion of multiple consecutive symbols of the SRS for positioning as a cyclic prefix for a remainder portion of another set of multiple consecutive symbols of the SRS for positioning.

Also or alternatively, implementations of such a UE may include one or more of the following features. To obtain the plurality of SRS transmission parameters the processor is configured to randomly or pseudo-randomly select a pilot sequence to be used for transmitting the SRS for positioning. To transmit the SRS for positioning the processor is configured to select a transmit beam to transmit the SRS for positioning corresponding to a receive beam associated with reception of a downlink reference signal from the communication network. The downlink reference signal includes an SSB (Synchronized Signal Block) or a PRS (Positioning Reference Signal).

Another example UE includes: means for obtaining a plurality of sounding reference signal (SRS) transmission parameters; and means for transmitting SRS for positioning in accordance with the plurality of SRS transmission parameters while the UE is in an unconnected state, relative to a communication network, or an inactive state.

Implementations of such a UE may include one or more of the following features. The means for transmitting the SRS for positioning are for transmitting the SRS for positioning in response to receiving an indication from the communication network triggering the transmitting of the SRS for positioning from the UE. The unconnected state includes a Radio Resource Control (RRC) idle mode or an RRC inactive mode, and the inactive state includes a discontinuous reception (DRX) inactive mode. The plurality of SRS transmission parameters include a transmission beam, or a pilot sequence, or a physical resource mapping, or a timing advance, or a first guard time before transmitting of the SRS for positioning, or a second guard time after transmitting of the SRS for positioning, or a combination of two or more thereof. The means for obtaining the plurality of SRS transmission parameters include means for receiving one or more configuration parameters, for transmission of sounding reference signals, from the communication network in response to a request from the UE. The means for obtaining the plurality of SRS transmission parameters include means for receiving one or more configuration parameters, for transmission of sounding reference signals, from the communication network while the UE is in the unconnected state relative to the communication network. The means for obtaining the plurality of SRS transmission parameters include means for receiving the one or more configuration parameters from the communication network in a broadcast system information block (SIB) message that also contains downlink positioning reference signal (DL-PRS) information. The means for obtaining the plurality of SRS transmission parameters include means for receiving the one or more configuration parameters from the communication network in a broadcast system information block (SIB) message dedicated to carrying the one or more configuration parameters.

Also or alternatively, implementations of such a UE may include one or more of the following features. The means for obtaining the plurality of SRS transmission parameters include means for determining at least one UE-specific configuration parameter of another SRS while the UE is connected to the communication network. The means for obtaining the plurality of SRS transmission parameters include means for determining each of the plurality of SRS transmission parameters based on an unconnected configuration parameter received, if at all, from the communication network by the UE while the UE is in an unconnected relative to the communication network, or based on a connected configuration parameter received while the UE is in a connected state relative to the communication network if no appropriate unconnected configuration parameter was received.

Also or alternatively, implementations of such a UE may include one or more of the following features. The UE includes means for refraining from transmitting any signal in a frequency band of the SRS for positioning for a first guard time before a beginning of transmission of the SRS for positioning, or for a second guard time after an end of transmission of the SRS for positioning, or a combination thereof. The means for transmitting the SRS for positioning include means for transmitting pilot sequences on an identical set of subcarriers on consecutive OFDM (Orthogonal Frequency Division Multiplexing) symbols for more than a maximum number of consecutive OFDM symbols allowed for transmission of SRS resources for positioning during connected communication between the UE and the communication network. The UE includes means for using a beginning portion of multiple consecutive symbols of the SRS for positioning as a cyclic prefix for a remainder portion of another set of multiple consecutive symbols of the SRS for positioning.

Also or alternatively, implementations of such a UE may include one or more of the following features. The means for obtaining the plurality of SRS transmission parameters include means for randomly or pseudo-randomly selecting a pilot sequence to be used for transmitting the SRS for positioning. The means for transmitting the SRS for positioning include means for selecting a transmit beam corresponding to a receive beam associated with reception of a downlink reference signal from the communication network. The downlink reference signal includes an SSB (Synchronized Signal Block) or a PRS (Positioning Reference Signal).

An example non-transitory, processor-readable storage medium includes processor-readable instructions configured to cause a processor of a user equipment (UE) to: obtain a plurality of sounding reference signal (SRS) transmission parameters; and transmit SRS for positioning from the UE in accordance with the plurality of SRS transmission parameters while the UE is in an unconnected state, relative to a communication network, or an inactive state.

Implementations of such a storage medium may include one or more of the following features. The instructions are configured to cause the processor to transmit the SRS for positioning in response to receiving an indication from the communication network triggering transmitting of the SRS for positioning from the UE. The unconnected state includes a Radio Resource Control (RRC) idle mode or an RRC inactive mode, and the inactive state includes a discontinuous reception (DRX) inactive mode. The plurality of SRS transmission parameters include a transmission beam, or a pilot sequence, or a physical resource mapping, or a timing advance, or a first guard time before transmitting of the SRS for positioning, or a second guard time after transmitting of the SRS for positioning, or a combination of two of more thereof. To obtain the plurality of SRS transmission parameters the instructions are configured to cause the processor to receive one or more configuration parameters, for transmission of sounding reference signals, from the communication network in response to a request from the UE. To obtain the plurality of SRS transmission parameters the instructions are configured to cause the processor to receive one or more configuration parameters, for transmission of sounding reference signals, from the communication network while the UE is in the unconnected state relative to the communication network. To obtain the plurality of SRS transmission parameters the instructions are configured to cause the processor to receive the one or more configuration parameters from the communication network in a broadcast system information block (SIB) message that also contains downlink positioning reference signal (DL-PRS) information. To obtain the plurality of SRS transmission parameters the instructions are configured to cause the processor to receive the one or more configuration parameters from the communication network in a broadcast system information block (SIB) message dedicated to carrying the one or more configuration parameters.

Also or alternatively, implementations of such a storage medium may include one or more of the following features. To obtain the plurality of SRS transmission parameters the instructions are configured to cause the processor to determine at least one UE-specific configuration parameter of another SRS while the UE is connected to the communication network. To obtain the plurality of SRS transmission parameters the instructions are configured to cause the processor to determine each of the plurality of SRS transmission parameters based on an unconnected configuration parameter received, if at all, from the communication network by the UE while the UE is in an unconnected relative to the communication network, or based on a connected configuration parameter received while the UE is in a connected state relative to the communication network if no appropriate unconnected configuration parameter was received.

Also or alternatively, implementations of such a storage medium may include one or more of the following features. The instructions are configured to cause the processor to refrain from transmitting any signal in a frequency band of the SRS for positioning for a first guard time before a beginning of transmission of the SRS for positioning, or for a second guard time after an end of transmission of the SRS for positioning, or a combination thereof. The instructions are configured to cause the processor to transmit the SRS for positioning by transmitting pilot sequences on an identical set of subcarriers on consecutive OFDM (Orthogonal Frequency Division Multiplexing) symbols for more than a maximum number of consecutive OFDM symbols allowed for transmission of SRS resources for positioning during connected communication between the UE and the communication network. The instructions are configured to cause the processor to use a beginning portion of multiple consecutive symbols of the SRS for positioning as a cyclic prefix for a remainder portion of another set of multiple consecutive symbols of the SRS for positioning.

Also or alternatively, implementations of such a storage medium may include one or more of the following features. To obtain the plurality of SRS transmission parameters the instructions are configured to cause the processor to randomly or pseudo-randomly select a pilot sequence to be used for transmitting the SRS for positioning. To transmit the SRS for positioning the instructions are configured to cause the processor to select a transmit beam to transmit the SRS for positioning corresponding to a receive beam associated with reception of a downlink reference signal from the communication network. The downlink reference signal includes an SSB (Synchronized Signal Block) or a PRS (Positioning Reference Signal).

DETAILED DESCRIPTION

Figure 1:
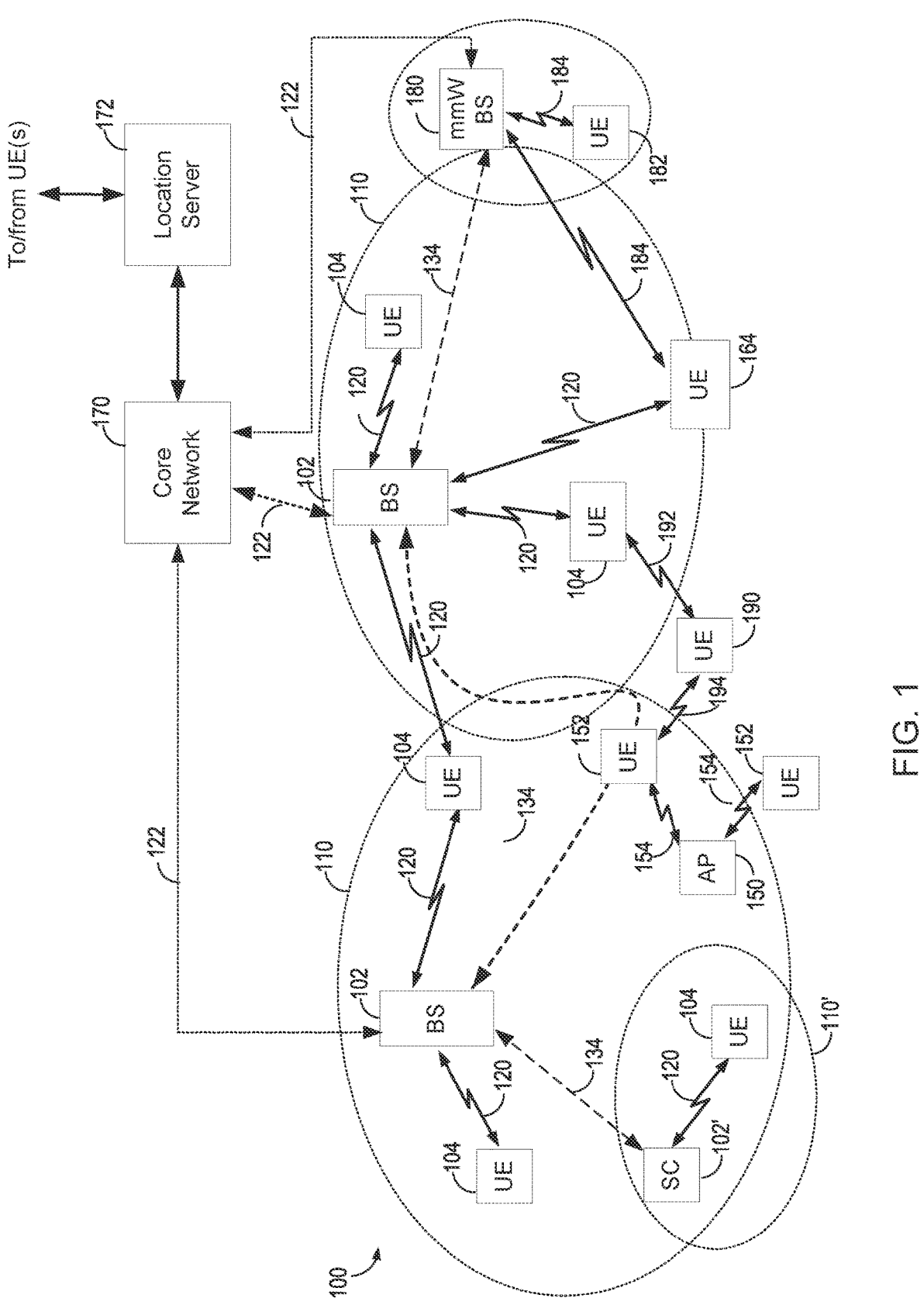
FIG. 1 illustrates an example wireless communications system.

Techniques are discussed herein for establishing transmission parameters for transmitting a positioning signal from user equipment (UE) while the UE is in an unconnected or inactive state. For example, a UE may receive (e.g., from a transmission/reception point (TRP)) one or more configuration parameters while in an unconnected state and/or while in a connected state. One or more of the configuration parameters may be transmitted by the TRP to the UE, and may be generic to multiple UEs, and/or one or more configuration parameters from the TRP may be specific to the UE and obtained while the UE is connected to the TRP (e.g., RRC connected and DRX active mode). The UE may use one or more of the configuration parameters as one or more of the transmission parameters and/or may use one or more of the configuration parameters to determine one or more of the transmission parameters. The UE may also or alternatively obtain one or more of the transmission parameters from measurements taken while the UE is connected to the TRP and/or connected to another TRP. The UE may transmit a sounding reference signal (SRS) for positioning in accordance with the transmission parameters, e.g., transmit the SRS for positioning in accordance with the transmission parameters while the UE is in an unconnected state or in an inactive state. These techniques are examples, however, and are not exhaustive.

Items and/or techniques described herein may provide one or more of the following capabilities, as well as other capabilities not mentioned. Positioning signals may be transmitted by a UE while the UE is outside of a connected state relative to a communication network or in a connected but inactive state. A pilot sequence for transmitting an SRS for positioning may be randomized, which may help avoid collisions between signals sent by neighboring UEs that receive the same positioning signal configuration parameters. Transmission of one or more SRSs for positioning, by a UE, that are unexpected by a transmission/reception point may be avoided, thus conserving energy of the UE. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

The information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Many features are described in terms of sequences of actions to be performed by, for example, elements of a computing device. Various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory processor-readable storage medium having stored therein a corresponding set of processor-readable instructions that, upon execution, would cause or instruct an associated processor of a device to perform the functionality described herein. Thus, various features of the disclosure may be embodied in a number of different forms, all of which are within the scope of the claimed subject matter.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Referring to FIG. 1, an example wireless communications system 100 includes components as shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). The macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. The location server 172 may be configured to communicate directly with one or more of the UEs. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. One or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. The foregoing illustrations are examples and do not limit the description or claims.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 (a sidelink) with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
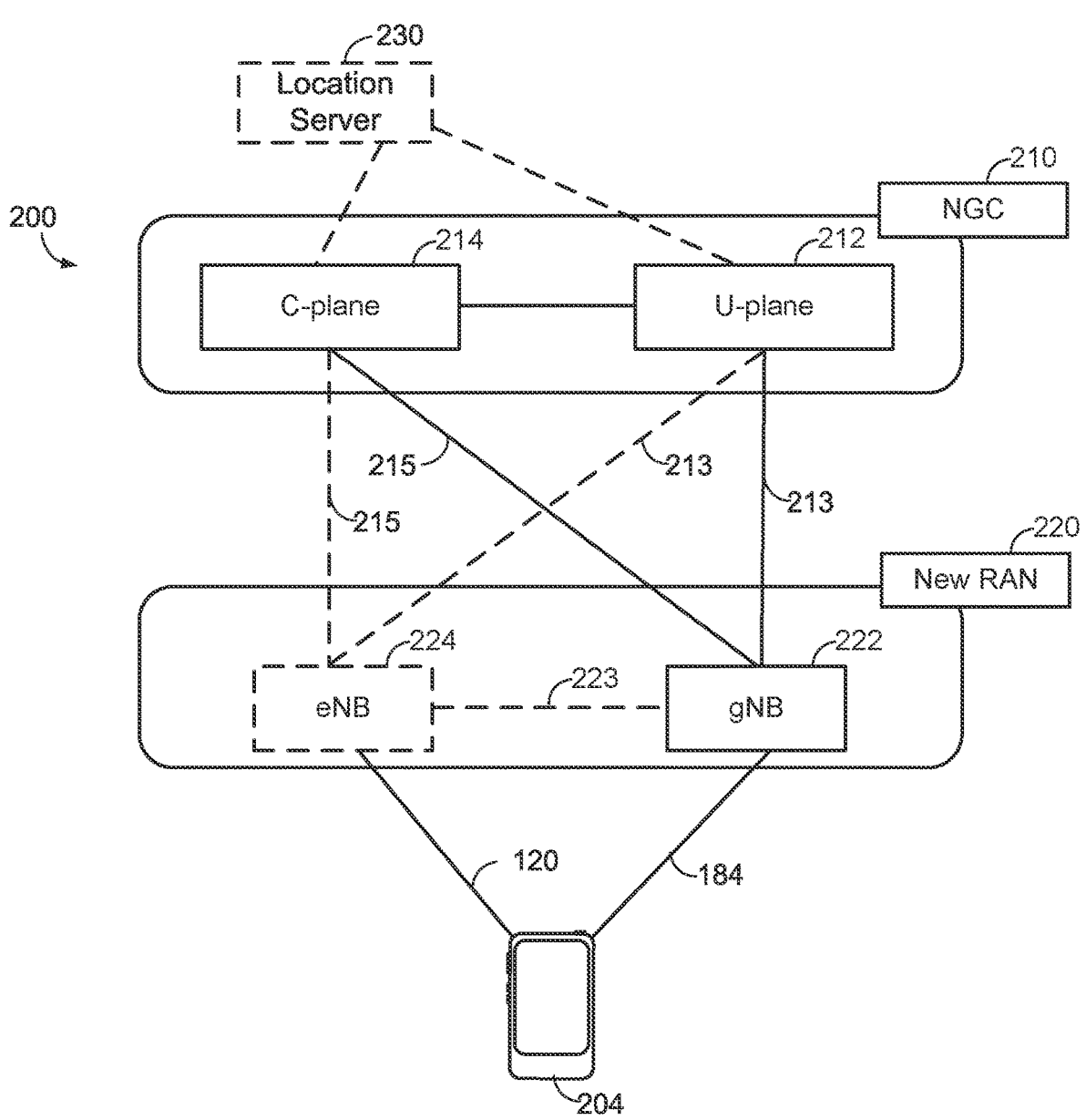
FIG. 2A illustrates another example wireless network structure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). A location server 230 may be included, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
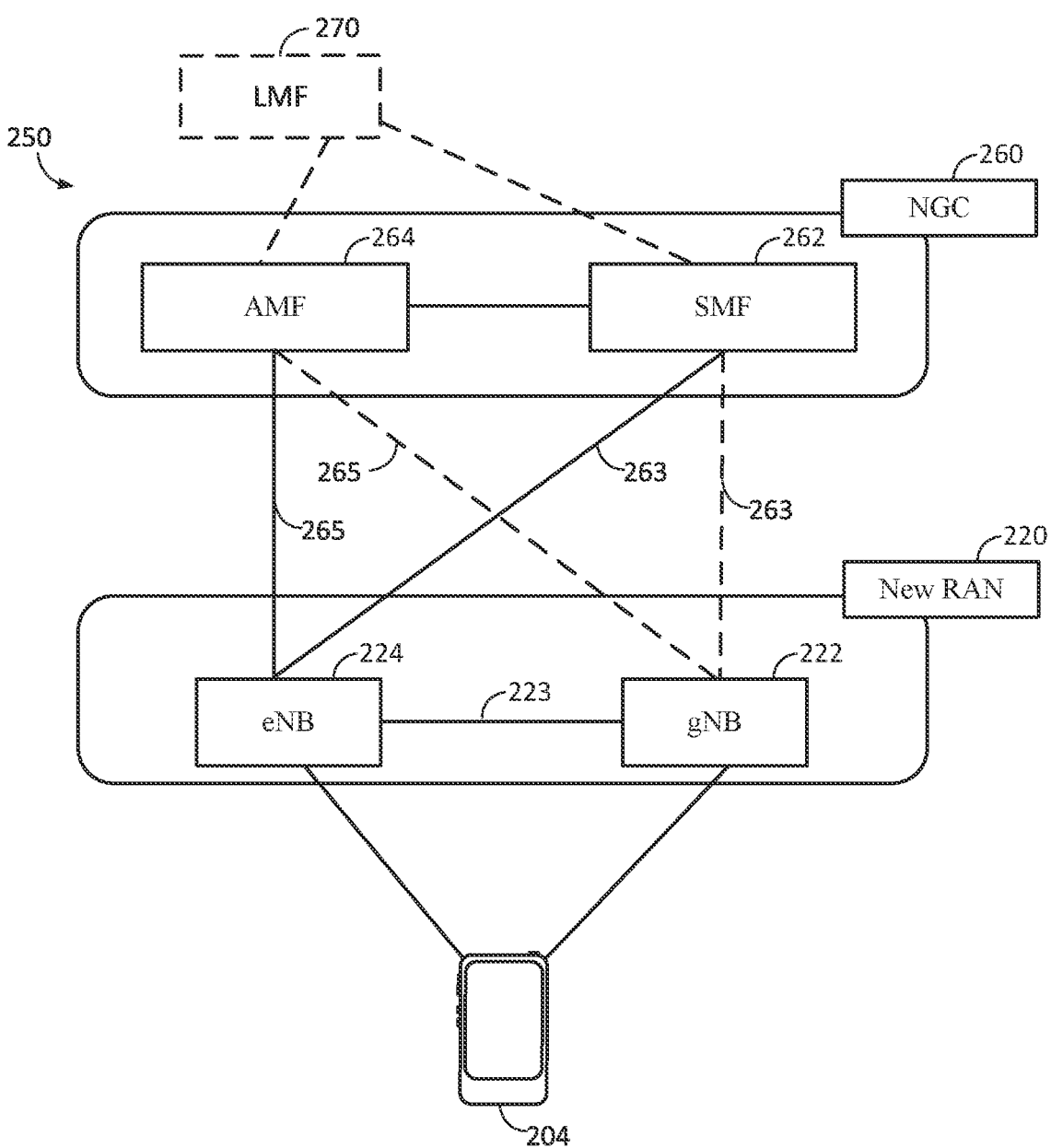
FIG. 2B illustrates another example wireless network structure.

FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and a Location Management Function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

The LMF 270 may be included, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
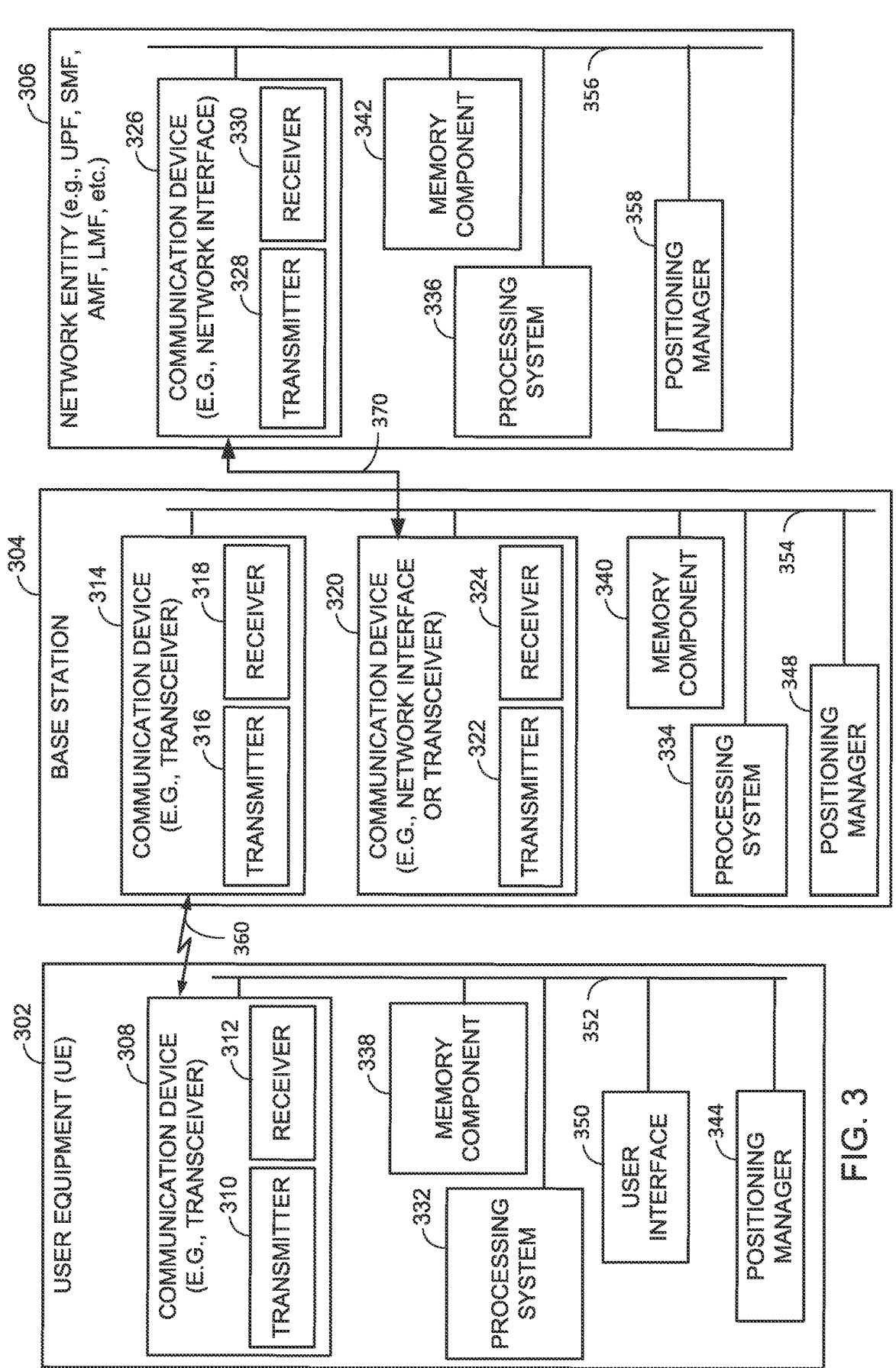
FIG. 3 is a block diagram illustrating example apparatuses of FIG. 1.

FIG. 3 illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the base station 304 is a relay)) for communicating with other nodes via at least one designated RAT. For example, the communication devices 308 and 314 (e.g., transceivers) may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise a transceiver that may be an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, the communication device 320) for communicating with other nodes. For example, the communication device 326 may comprise a network interface that is configured to communicate with one or more network entities via a wire-based or wireless backhaul 370 (which may correspond to the backhaul link 122 in FIG. 1). The communication device 326 may be implemented as a transceiver configured to support wire-based or wireless signal communication, and the transmitter 328 and receiver 330 may be an integrated unit. This communication may involve, for example, sending and receiving: messages, parameters, or other types of information. Accordingly, in the example of FIG. 3, the communication device 326 is shown as comprising a transmitter 328 and a receiver 330. Alternatively, the transmitter 328 and receiver 330 may be separate devices within the communication device 326. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for an RRC layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas of the communication device 314. The transmitter 316 may modulate an RF carrier with a respective spatial stream for transmission.

At the UE 302, the receiver 312 receives a signal through its respective antenna(s) of the communication device 308. The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

The apparatuses 302, 304, and 306 may include positioning managers 344, 348, and 358 respectively. The positioning managers 344, 348, and 358 may be hardware circuits that are part of or coupled to the processing systems 332, 334, and 336, respectively, that, when executed, cause the apparatuses 302, 304, and 306 to perform the functionality described herein. Alternatively, the positioning managers 344, 348, and 358 may be memory modules stored in the memory components 338, 340, and 342, respectively, that, when executed by the processing systems 332, 334, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs. Further, the UE 302 may be a low-tier UE or a premium UE, depending on the capabilities and functionality of the UE 302 (e.g., number of antennas of the communication device 308, bandwidth processing capability of the communication device 308, processing capability of the processing system 332, etc.).

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 348 may be implemented by processor and memory component(s) of the base station 304 (e.g., by execution of appropriate code and/or by appropriate configuration of processor components). Also, some or all of the functionality represented by blocks 326, 336, 342, and 358 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 334, 336, the communication devices 308, 314, 326, the positioning managers 344, 348, and 358, etc.

Figure 4:
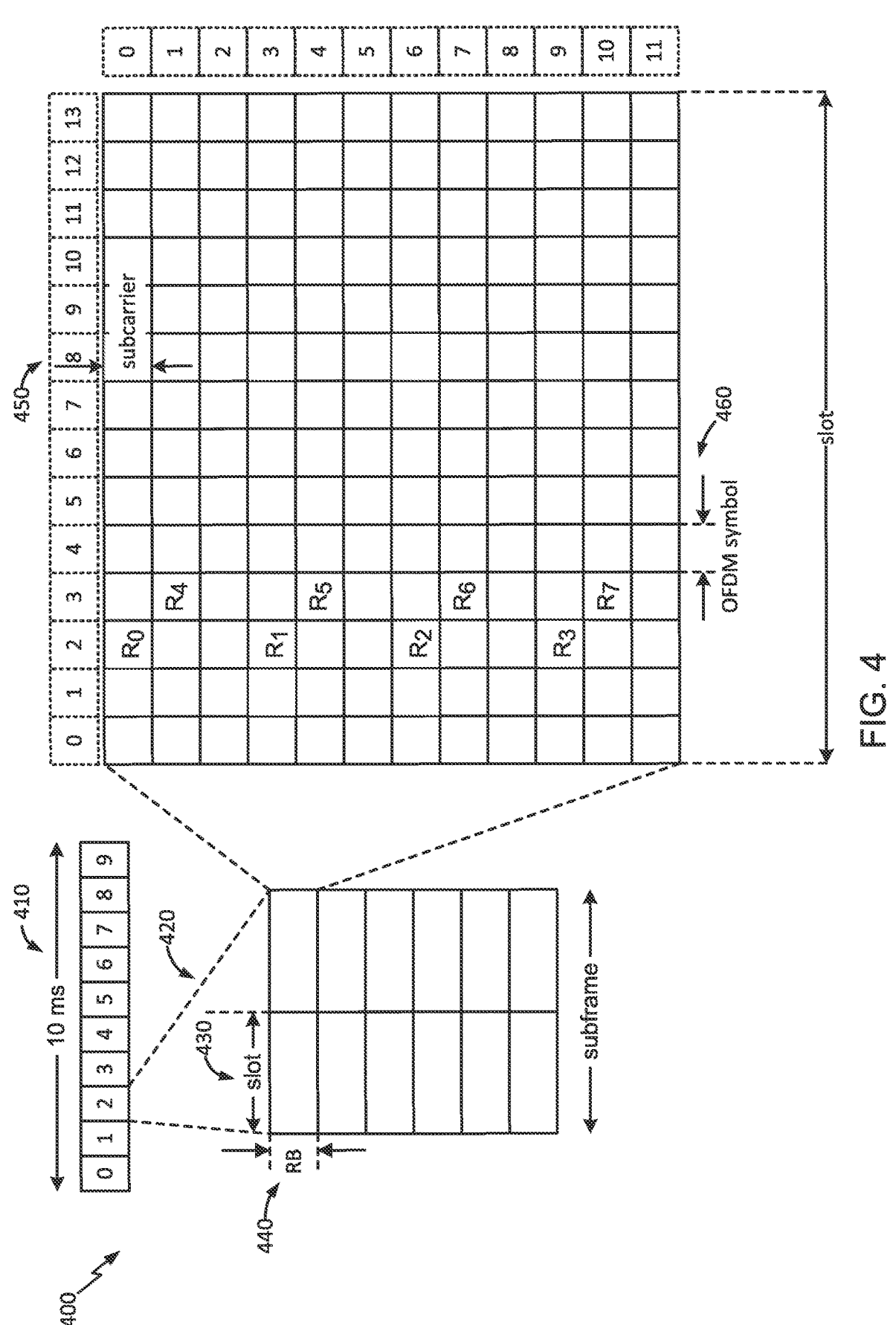
FIG. 4 is a diagram illustrating an example of a frame structure for use in a wireless telecommunications system.

Various frame structures may be used to support downlink and uplink transmissions between network nodes (e.g., base stations) and UEs. FIG. 4 illustrates an example of a frame structure 400. The frame structure for any particular application may be different depending on any number of factors. In FIG. 4, time is represented horizontally (e.g., on the X axis) with time increasing from left to right, while frequency is represented vertically (e.g., on the Y axis) with frequency increasing (or decreasing) from bottom to top. In the time domain, a frame 410 (e.g., 10 ms) may be, as here, divided into 10 equally sized subframes 420 (e.g., 1 ms each). In this example, each subframe 420 includes two consecutive time slots 430 (each of 0.5 ms).

A resource grid may be used to represent two time slots 430, each time slot 430 including one or more resource blocks (RBs) 440 (also referred to as "physical resource blocks" or "PRBs" in the frequency domain). In NR, a resource block 440 contains 12 consecutive subcarriers 450 in the frequency domain and, for a normal cyclic prefix (CP) in each OFDM symbol 460, 14 consecutive OFDM symbols 460 in the time domain. A resource of one OFDM symbol length in the time domain and one subcarrier in the frequency domain (represented as a block of the resource grid) is referred to as a resource element (RE). As such, in the example of FIG. 4, there are 168 resource elements in a resource block 440.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers 450, which are also commonly referred to as tones, bins, etc. Each subcarrier 450 may be modulated with data. In general, modulation symbols are sent in the frequency domain with OFDM and in the time domain with SC-FDM. The spacing between adjacent subcarriers 450 may be fixed, and the total number of subcarriers 450 (K) may be dependent on the system bandwidth. For example, the spacing of the subcarriers 450 may be 15 kHz and the minimum resource allocation (resource block) may be 12 subcarriers 450 (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

With continued reference to FIG. 4, some of the resource elements (REs), indicated as $R_0$, $R_1$, $R_2$, $R_3$, $R_4$, $R_5$, $R_6$, $R_7$, include a reference signal such as a reference signal used for positioning such as an SRS for positioning. The SRS for positioning may be transmitted in accordance with transmission parameters that may be obtained (e.g., determined) from one or more UE-generic configuration parameters and/or one or more UE-specific configuration parameters and/or one or more measurements as discussed herein. The number of bits carried by each resource element depends on the modulation scheme. Thus, the more resource blocks 440 that a UE transmits and the higher the modulation scheme, the higher the data rate for the UE.

A UE may transmit radio frames (e.g., radio frames 410), or other physical layer signaling sequences, supporting SRS for positioning according to frame configurations either similar to, or the same as that, shown in FIG. 4, which may be measured and used for determining a position estimate for a UE (e.g., any of the UEs described herein).

A collection of resource elements that are used for transmission of SRS is referred to as an "SRS resource." The collection of resource elements can span multiple RBs in the frequency domain and M (e.g., 1 or more) consecutive symbol(s) 460 within a slot 430 in the time domain. In a given OFDM symbol 460, an SRS resource occupies consecutive RBs. An SRS resource is described by at least the following parameters: SRS resource identifier (ID), sequence ID, comb size-N, resource element offset in the frequency domain, starting slot and starting symbol, number of symbols per SRS resource (i.e., the duration of the SRS resource), and QCL information. Currently, one antenna port is supported. The comb size indicates the number of sub-carriers in each symbol carrying SRS. For example, a comb-size of comb-4 means that every fourth subcarrier of a given symbol carries SRS. In the example shown in FIG. 4, the SRS resources are staggered, with the REs $R_0$-$R_3$ and the REs $R_4$-$R_7$ using the same total bandwidth but with different subcarriers in the different symbols (here with the REs $R_0$-$R_3$ each being offset by one RE from the REs $R_4$-$R_7$.

An "SRS resource set" is a set of SRS resources used for the transmission of SRS signals, where each SRS resource has an SRS resource ID. In addition, the SRS resources in an SRS resource set are associated with the same UE. An SRS resource set is identified by an SRS resource set ID. An SRS resource ID in an SRS resource set is associated with a single beam (and/or beam ID) transmitted from a UE. That is, each SRS resource of an SRS resource set may be transmitted on a different beam.

An "SRS occasion" is one instance of a periodically-repeated time window (e.g., a group of one or more con-secutive slots) where SRS are expected to be transmitted. An SRS occasion may also be referred to as an "SRS positioning occasion," a "positioning occasion," or simply an "occasion."

Note that the terms "sounding reference signal" and "SRS" may sometimes refer to specific reference signals that are used for positioning in LTE systems. While the discussion herein refers to sounding reference signals for position-ing and SRS for positioning, the discussion may be applied to other types of positioning signals.

Connecting a UE to a TRP

Figure 5:
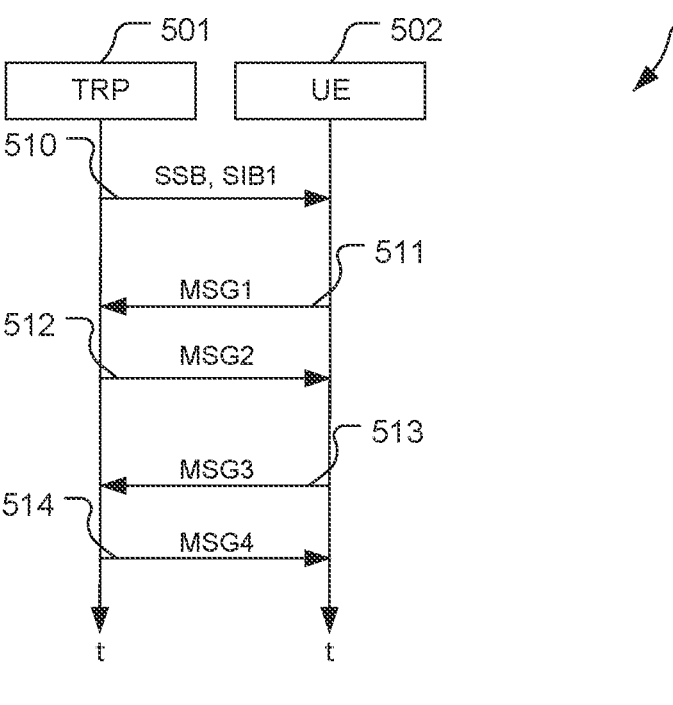
FIG. 5 is a signal flow diagram for connecting user equipment to a transmission/reception point.

Referring to FIG. 5, with further reference to FIGS. 1-3, a TRP 501 (e.g., of the base station 304) and a UE 502 (e.g., the UE 302) are configured to communicate with each other according to a signal flow 500 to establish an RRC connec-tion of the UE 502 to a communication network (e.g., comprising base stations 102 and the core network 170 shown in FIG. 1) including the TRP 501. The signal flow 500 is a four-step process using the RACH (Random Access CHannel) for connecting the TRP 501 and the UE 502. Once connected, the UE 502 and the TRP 501 may exchange unicast messages. The signal flow 500 may be followed to transition from an unconnected state of the UE 502 (i.e., the UE 502 is outside of a connected state with the communi-cation network, e.g., through and including the TRP 501) to a connected state. For example, the signal flow 500 may be followed when the UE 502 is powered up or wakes from sleeping, or desires to transition from an RRC idle state (RRC idle mode) or RRC inactive state (RRC inactive mode) to an RRC connected state. In either of the RRC idle state or the RRC inactive state the UE 502 is unconnected.

At stage 510 of the signal flow 500, the TRP 501 sends synchronization information in an SSB message and a SIB1 synchronization information block. The TRP 501 broadcasts the SSB and SIB1 messages. The UE 502 receives (via the communication device 308, and in particular the receiver 312) the SSB and from the SSB identifies the SIB1 message. The UE 502 receives, via the communication device 308, the SIB1 message from the TRP 501.

From the SIB1 message, the UE 502 determines one or more transmission parameters of a RACH preamble sequence to be sent to the TRP 501 at stage 511 in a first message MSG1. The UE 502 (e.g., processing system 332) selects a RACH preamble sequence and determines a RACH occasion (RO) (e.g., which may occur periodically, e.g., every 10 ms, 20 ms, 40 ms, 80 ms, 160 ms) according to SSB-to-RO mapping for transmitting the RACH preamble. For example, the UE 502 may determine to send the RACH preamble at the next (in time) RACH occasion. The RO is the time/frequency opportunity for the UE 502 to transmit a RACH preamble. There are different RACH preamble for-mats, and correspondingly different RO sizes. Due to reci-procity of antennas, the UE 502 may determine which receive (Rx) beam best received a synchronization signal (e.g., the SSB) and select the corresponding transmit (Tx) beam for transmitting the RACH preamble. If reciprocity is available at the TRP 501, then the UE 502 may transmit the MSG1 once, and otherwise may repeat the MSG1 message for each of the TRP Tx beams. The UE 502 may be configured to send the first message MSG1 using the PRACH (Physical RACH).

The TRP 501 is configured to respond to the MSG1 message sent at stage 511 (also called step 1) by sending a response or second message MSG2 at stage 512 (also called step 2). The response message MSG2 may be a random access response (RAR) UL grant that the TRP 501 sends using the PDSCH (Physical Downlink Shared CHannel) with a selected Tx beam. The second message MSG2 acknowledges receipt of the first message MSG1 and may provide some collision avoidance information. Based on the messages MSG1, MSG2, the TRP 501 and the UE 502 may establish coarse beam alignment that may be used in stages 513, 514 discussed below.

The UE 502 is configured to receive the response message MSG2 and respond, at stage 513 (also called step 3), by sending a third message MSG3 using resources scheduled by the TRP 501. The TRP 501 is thus aware of where to detect the third message MSG3 and which TRP Rx beam should be used to detect the third message MSG3. The UE 502 may be configured to send the third message MSG3 using the PUSCH (Physical Uplink Shared CHannel) using the same beam as, or a different beam than, the UE 502 used to send the first message MSG1.

At stage 514 (also called step 4), the TRP 501 confirms receipt of the third message MSG3 by sending a fourth message MSG4 in the PDSCH using the TRP Tx beam determined in stage 512. At this point, the UE 502 has identified synchronization between the TRP 501 and the UE 502, has identified resources for transmit and receive, and is connected to the communication network (through and including the TRP 501), i.e., is in a connected state (an RRC connected state).

Figure 6:
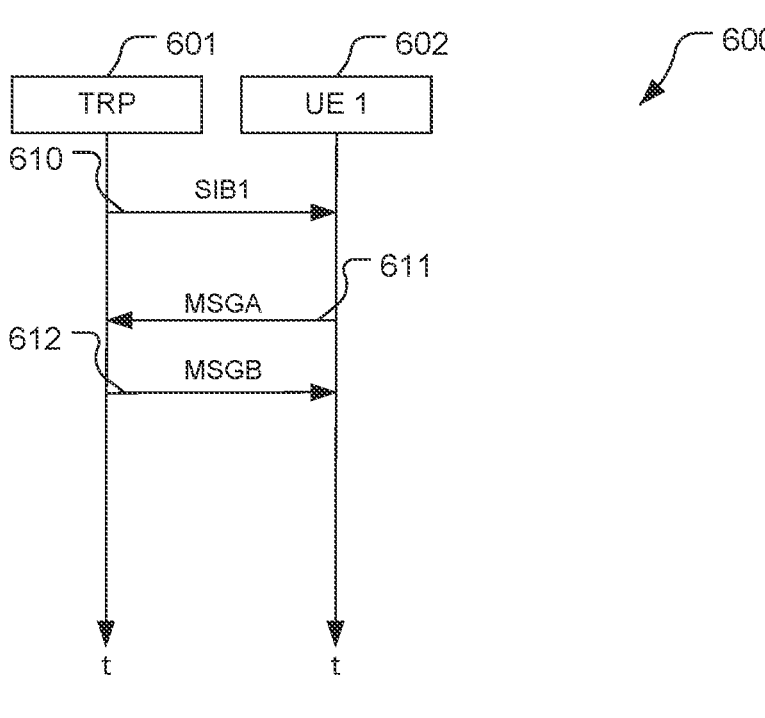
FIG. 6 is another signal flow diagram for connecting user equipment to a transmission/reception point.

Referring also to FIG. 6, a TRP 601 (e.g., of the base station 304) and a UE 602 (e.g., the UE 302) are configured to communicate with each other according to a signal flow 600 to establish RRC connection of the UE 602 to a communication network (e.g., comprising base stations 102 and the core network 170 shown in FIG. 1) including the TRP 601. The signal flow 600 is a two-step process using the RACH (Random Access CHannel) for connecting the TRP 601 and the UE 602. The signal flow 600 is effectively a two-step version of the four-step signal flow 500 shown in FIG. 5. At stage 610, the UE 602 receives the SSB and SIB1. At stage 611 (step 1 in the two-step process), the UE 602 sends an initial message MSGA after receipt of the SSB and SIB1. The initial message MSGA uses both PRACH and PUSCH. At stage 612 (step 2 in the two-step process), the TRP 601 sends a response message MSGB to the UE 602 to connect the UE 602 to the TRP 601.

Transmission of Positioning Signal from UE

Figure 7:
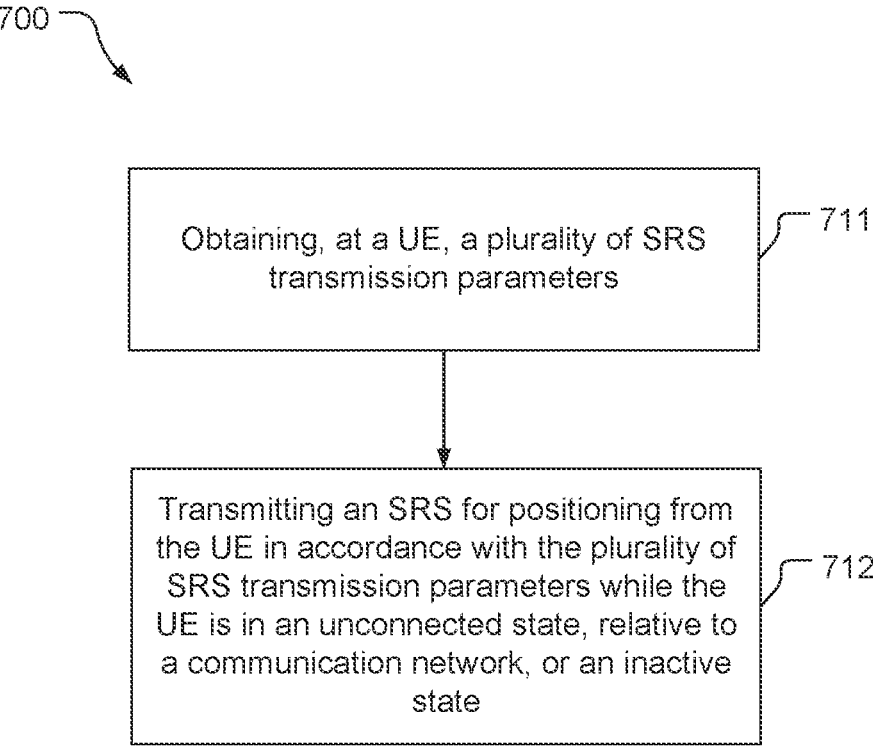
FIG. 7 is a block flow diagram of a method of transmitting a positioning signal.

Referring to FIG. 7, with further reference to FIGS. 1-6, a method 700 of transmitting a positioning signal includes the stages shown. The method 700 is, however, an example only and not limiting. The method 700 may be altered, e.g., by having stages added, removed, rearranged, combined, performed concurrently, and/or having single stages split into multiple stages.

The method 700 provides techniques for transmitting an SRS for positioning (possibly including multiple SRS for positioning signals) from a UE, e.g., while the UE is in an unconnected or inactive state. At stage 711, the method includes obtaining, at a UE, a plurality of transmission parameters. The SRS transmission parameters may be used in transmission of the SRS for positioning from the UE, including while the UE is unconnected from a communication network or in an inactive state (e.g., connected but inactive). For example, the UE 302 may obtain one or more configuration parameters that the UE 302 will use as one or more transmission parameters to control how the UE 302 will transmit (e.g., broadcast) one or more SRS for positioning while the UE 302 is in an unconnected state, i.e., outside of a connected state, or in an inactive state. At stage 712, the method 700 includes transmitting the SRS for positioning from the UE in accordance with the plurality of SRS transmission parameters while the UE is in an unconnected state, relative to a communication network, or an inactive state. For example, the UE 302 may transmit an SRS for positioning while the UE 302 is in the unconnected or inactive state and while applying the transmission parameters. In the unconnected state, the UE is unconnected from (not connected to or synchronized with) the communication network, has no active BWP (bandwidth part), and cannot transmit information to, or receive information from, the communication network using unicast transmission. Examples of the unconnected state include RRC Idle defined in 3GPP, and RRC Inactive defined in 3GPP. The inactive state may be a DRX (Discontinuous Reception) inactive state (e.g., either short cycle DRX mode or long cycle DRX mode). In the inactive state, the UE is connected (e.g, RRC connected) to the network and in a sleep mode of reduced functionality relative to an active state, e.g., such that the UE is not required to monitor a downlink channel (e.g., the PDCCH (Physical Downlink Control Channel). In the inactive state (e.g., RRC inactive), signaling and power consumption may be reduced relative to the active state while facilitating quick resumption of the active state as the UE is connected to the network in the inactive state. For example, not monitoring the downlink channel may help conserve battery power. In the inactive state, the UE may not be required to provide, and may not provide, channel quality reporting. In the inactive state, the UE may store access stratum context, may read system information (SI), may perform RNA (RAN Notification Area) updates, may apply DRX for paging, may monitor the PDCCH DCI (Downlink Control Information) using P-RNTI (Paging Radio Network Temporary Identifier), and may monitor the PCCH (Paging Control Channel) for CN (Core Network) paging using 5G-S-TMSI (SAE TMSI (System Architecture Evolution Temporary Mobile Subscriber Identity)) and RAN paging using I-RNTI (Inactive-RNTI). Example details of the method 700 are discussed below with respect to FIG. 8.

The UE may obtain transmission parameters in a variety of ways. For example, the UE 302 may receive one or more configuration parameters, that are generic to multiple UEs, from the TRP while the UE 302 is in an unconnected state. As another example, the UE 302 may receive one or more configuration parameters, that are specific to the UE 302, from a TRP while the UE 302 is connected to the TRP (e.g., RRC connected and DRX active mode). As another example, the UE 302 may make one or more measurements (or receive one or more indications of one or more measurements) of one or more signals. The UE 302 may determine transmission parameters from the configuration parameters and/or measurements. For example, a configuration parameter may indicate a receive beam and the UE 302 may select a transmit beam, corresponding to the receive beam, for transmitting SRS for positioning. As another example, a received signal power measurement may be used by the UE 302 to determine a transmit power for transmitting SRS for positioning.

Figure 8:
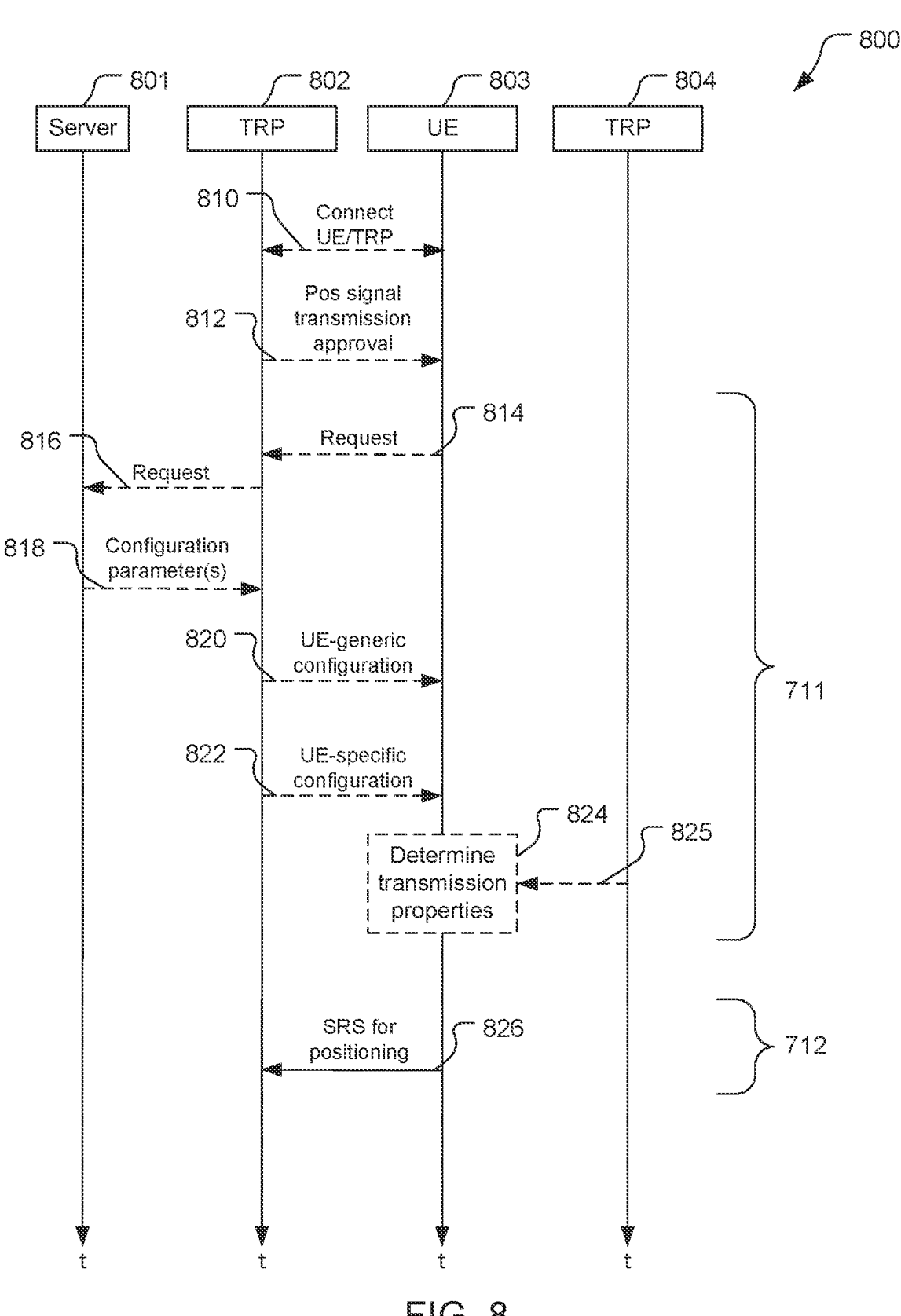
FIG. 8 is a signal and process flow diagram for transmitting a positioning signal.

Referring to FIG. 8, with further reference to FIGS. 1-7, a signal and process flow 800 for transmitting a positioning signal includes the stages shown. The flow 800 is, however, an example only and not limiting. The flow 800 may be altered, e.g., by having stages added, removed, rearranged, combined, performed concurrently, and/or having single stages split into multiple stages. For example, signals (shown by arrows) or processes (shown by boxes) shown in dashed lines are optional and may be omitted. While all of the signals and operations shown in the flow 800 corresponding to the stage 711 (see also FIG. 7) are shown as optional, at least one of the features (provision of a signal or process) shown in the flow 800 corresponding to the stage 711 will be performed. As shown in the flow 800, a server 801, a TRP 802 (e.g., of the base station 304), a UE 803 (e.g., the UE 302 such as one of the UEs shown in FIG. 1), and a TRP 804 (e.g., of another of the base stations 304 (i.e., other than the TRP 801) of the base stations shown in FIG. 1) are configured to communicate with each other according to the signal and process flow 800 to implement an example of the method 700.

At stage 810, the UE 803 may connect to the TRP 802. For example, the UE 803 and the TRP 802 may be configured to perform the flow 500 and/or the flow 600 and may connect the UE 803 to the communication network through and including the TRP 802 according to the flow 500 or the flow 600 as discussed above.

At stage 812, the TRP 802 may send a positioning signal transmission endorsement to the UE 803. For example, the TRP 802 (e.g., the processing system 334, the communication device 314, and possibly the memory component 340) may be configured to send an indication endorsing the UE 803 to transmit one or more positioning signals. The communication device 308 and the processing system 332 (possibly in conjunction with the memory component 338) of the UE 803 may comprise means for receiving the indication of the endorsement of transmitting a positioning signal and means for transmitting SRS for positioning in response to receiving the indication of endorsement (e.g., triggering) of transmitting of the positioning signal (e.g., SRS for positioning). The endorsement sent at stage 812 may indicate that the UE 803 may transmit a positioning signal while the UE 803 is in an unconnected or inactive state. Thus, the method 700 shown in FIG. 7 may include the UE 803 receiving the endorsement from the TRP 802, which may approve or permit the transmission of the positioning signal by the UE while the UE is in an unconnected state (e.g., RRC idle or RRC inactive) or in an inactive state (e.g., RRC connected but inactive). The endorsement may serve as a trigger for transmitting the SRS for positioning. The UE 803 may be configured not to transmit a positioning signal while the UE 803 is unconnected from the communication network or inactive unless the UE 803 receives the transmission endorsement indication. Otherwise, the UE 803 may transmit a positioning signal but the TRP 802 may not listen for the positioning signal, thus wasting energy by the UE 803 and unnecessarily congesting the airwaves within range of the UE 803. The UE 803 may be configured to transmit a positioning signal without the endorsement, but use receipt of the endorsement, e.g., to enable or trigger one or more functions (e.g., a positioning technique such as RTT).

At stage 814, the UE 803 may send a request for one or more configuration parameters to be used to determine one or more transmission parameters to be used by the UE 803 for transmitting an SRS for positioning while the UE 803 is in an unconnected or inactive state (i.e., in an unconnected state or in an inactive state). Each of the configuration parameters is an indication of a characteristic of, or a characteristic controlling, conveyance of signals (e.g., positioning signals) between the TRP 802 and the UE 803. For example, the UE 803 (e.g., the processing system 332, the communication device 308, and possibly the memory component 338) may be configured to send the request using the RACH while the UE 803 is in an unconnected state or while the UE 803 is connected with the TRP 802. Thus, the processing system 332, the communication device 308, and possibly the memory component 338 may comprise means for sending the request (means for requesting the transmission parameter(s)). The transmission parameter(s) may be for transmitting one or more SRS for positioning while the UE 803 is in an unconnected or inactive state. The request may request that the TRP 802 send one or more configuration parameters in a dual-purpose positioning SIB that also includes DL PRS (Downlink Positioning Reference Signal) information or in a dedicated positioning SIB for the configuration parameters that will not include DL PRS information. Alternatively, the request may not specify whether to send the configuration parameter(s) in a dual-purpose SIB or a dedicated SIB, and the TRP 802 may be configured to respond to such an unspecified request by choosing whether to send the configuration parameter(s) in a dual-purpose SIB or in a dedicated SIB. The UE 803 may send the request as part of MSG1, MSG3, or MSGA as discussed with respect to FIGS. 5 and 6, respectively. The request may include one or more (UE-generic) configuration parameters with specific transmission parameters, e.g., a larger bandwidth than a threshold bandwidth, a longer length than a threshold SRS resource length, etc. As the TRP 802 may be configured to respond to the request by providing the requested configuration(s) (as discussed below), acquisition of the configuration parameter(s) may be considered to be on demand and/or the transmission parameters of the UE 803 for transmitting an SRS for positioning while the UE 803 is in an unconnected or inactive state may be considered to be on demand. The request at stage 814 may be sent from the UE 803 while the UE 803 is in an unconnected state, or in a connected state (i.e., RRC connected to the TRP 802).

At stage 816, the TRP 802 may send a request for the configuration parameter(s) to the server 801 (e.g., the network entity 306 such as an LMF), and at stage 818, the server 801 may send one or more configuration parameters to the TRP 802 for relaying to the UE 803. The TRP 802 and/or the server 801 may be configured to determine one or more configuration parameters for configuring one or more UEs for transmitting SRS for positioning. The server 801 may provide one or more configuration parameters to the TRP 802 at stage 818 in response to the request received at stage 816, or without having been requested.

At stage 820, the TRP 802 may provide one or more UE-generic configuration parameters to the UE 803 while the UE 803 is in an unconnected state. The TRP 802 (e.g., the communication device 314 as controlled by the processing system 334 and the memory component 340) may broadcast the one or more UE-generic configuration parameters. The parameter(s) are UE-generic in that the parameter(s) are sent for use by multiple UEs potentially, and not directed at a single UE, and thus contain information that may be used by multiple UEs in configuring transmission parameters for SRS for positioning. The UE-generic configuration parameter(s) may be provided in response to the request sent by the UE 803 at stage 814. The UE-generic configuration parameter(s) provided at stage 820 may include the endorsement discussed above with respect to stage 812. The endorsement may be explicit or implicit (e.g., the transmission of the UE-generic configuration parameter(s) for use in determining one or more transmission parameters implying that the TRP 802 endorses transmitting the SRS for positioning while the UE 803 is in an unconnected or inactive state). The configuration information sent at stage 820 may be provided in a broadcast channel, e.g., a SIB that may be a dual-purpose SIB or a dedicated SIB for providing the configuration information. The configuration information provided at stage 820 may provide UE-generic configuration information as requested by the UE 803 at stage 814 and any other UE from which the TRP 802 received a configuration parameter request.

At stage 822, the TRP 802 may provide one or more UE-specific configuration parameters to the UE 803 while the UE 803 is connected to the TRP 802. The TRP 802 (e.g., the communication device 314 as controlled by the processing system 334 and the memory component 340) may send the UE-specific configuration parameter(s) to the UE 803 while the UE 803 is connected to the TRP 802 (e.g., RRC connected and DRX active mode). Thus, the TRP 802 may send the UE-specific configuration parameter(s) to the UE 803 in a unicast communication. As with the UE-generic configuration parameter(s), the UE-specific configuration parameter(s) may be provided in response to the request sent by the UE 803 at stage 814 and may include, explicitly and/or implicitly, the endorsement discussed above with respect to stage 812. One or more of the UE-specific configuration parameter(s) may be associated (e.g., by configuration, written in a specification, etc.) with one or more corresponding UE-generic configuration parameters, e.g., through a one-to-one mapping. Both stages 820, 822 are shown in dashed lines as being optional, and the TRP 802 may provide UE-generic configuration information at stage 820 and UE-specific configuration information at stage 822, or only UE-generic configuration information at stage 820 and not UE-specific configuration information at stage 822, or only UE-specific configuration information at stage 822 and not UE-generic configuration information at stage 820, or neither UE-generic configuration information at stage 820 nor UE-specific configuration information at stage 822.

Figure 9:
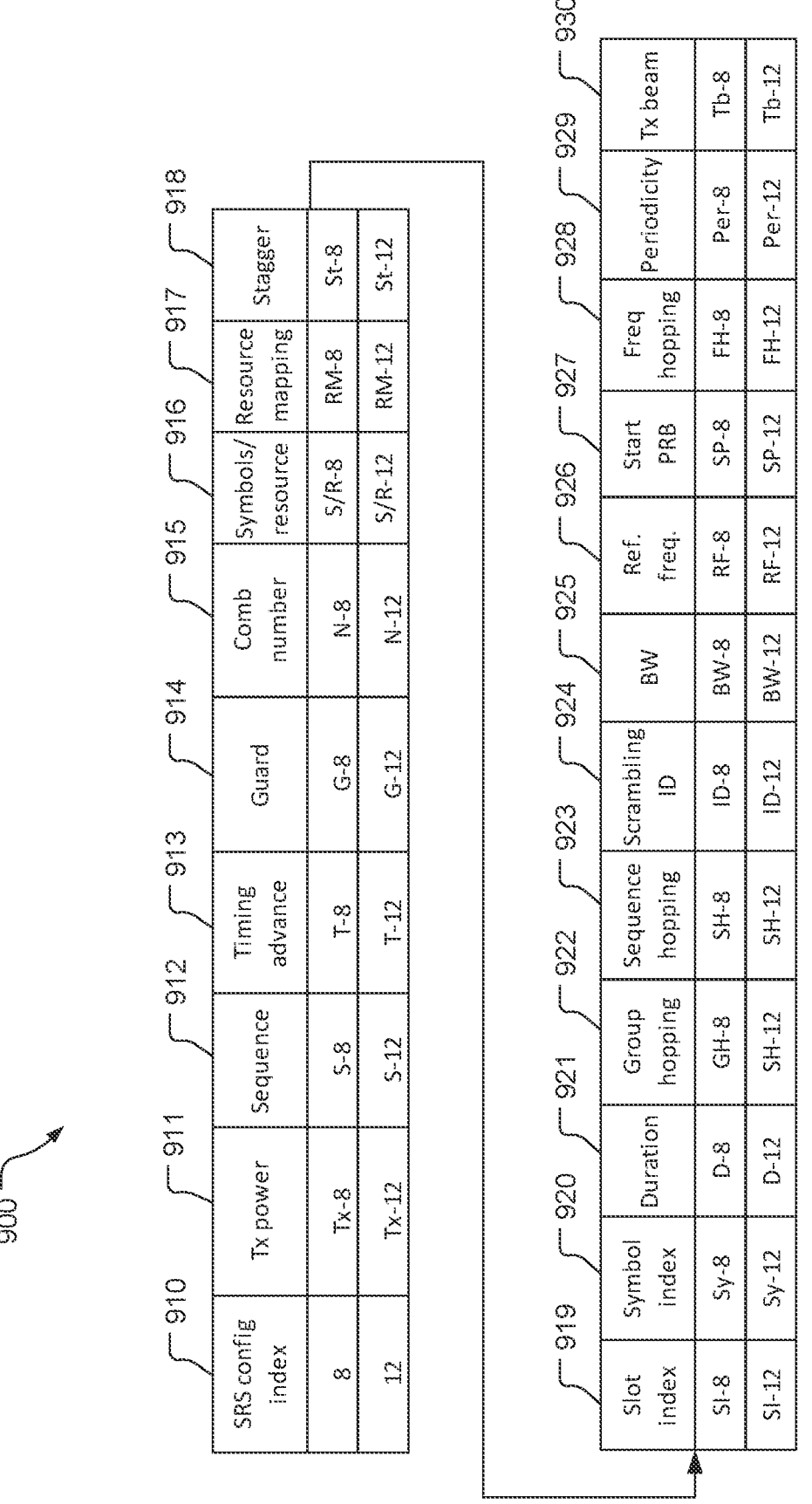
FIG. 9 is a table of positioning signal indexes and corresponding configuration parameters.

The UE-generic configuration parameter(s) and/or the UE-specific configuration parameter(s) sent at stages 820, 822 may be tabulized. The configuration parameters may be tabulized to reduce a number of bits transmitted (reducing overhead) which may reduce congestion and/or reduce collisions, and save energy for transmitting the configuration parameters. Tabulizing the configuration parameters encodes the configuration parameters so that a small number of bits is mapped to more information. It may be possible for a configuration parameter to be used directly as a transmission parameter, and/or to be used (alone or in combination with one or more other configuration parameters) to determine a transmission parameter. For example, as shown in FIG. 9, a table 900 of configuration parameters includes an index field 910, a transmit (Tx) power field 911, a sequence field 912, a timing advance field 913, a guard field 914, a comb number field 915, a symbols per resource field 916, a resource mapping field 917, a stagger field 918, a slot index field 919, a symbol index field 920, a duration field 921, a group hopping field 922, a sequence hopping field 923, a scrambling ID field 924, a bandwidth (BW) field 925, a reference frequency field 926, a start PRB field 927, a frequency hopping field 928, a periodicity field 929, and a transmit (Tx) beam field 930. The Tx power field 911 indicates a value that can be used to determine the Tx power of the UE 803 for the SRS for positioning. The sequence field 912 indicates a value that can be used to determine which Zadoff-Chu sequence to use for the SRS for positioning. The timing advance field 913 may indicate a timing delay from transmission by the UE 803 to the TRP 802 that the UE 803 may use to apply to an SRS resource for positioning. The guard field 914 indicates a guard time to be added to each SRS for positioning, before and/or after the SRS for positioning. The comb number field 915 controls the comb type of the SRS for positioning. The resource mapping field 917 provides a mapping of UE-specific resources and UE-generic resources. The stagger field 918, which may be part of the resource mapping field 917, indicates whether to stagger REs and if so, how to stagger (e.g., RE offset between symbols). The stagger field 918 may include the symbol index field 920. The slot index field 919 (which may be called an offset field) indicates in which slot to transmit (or in which slot to begin transmitting). The symbol index field 920 indicates at which symbols to transmit an SRS resource for positioning in a slot (e.g., at which symbol in a slot to begin transmitting an SRS resource for positioning). The duration field 921 indicates a time or number of symbols or other duration for transmitting an SRS resource for positioning. The group hopping field 922, the sequence hopping field 923, and the scrambling ID field 924 provide parameters for use in randomizing (e.g., by determining/selecting) a pilot sequence for conveying the SRS for positioning (e.g., as discussed in § 5.2.2 of 3GPP TS 38.214 Release 16, with u, v, and n in the specification being the group hopping, the sequence hopping, and the scrambling ID, respectively, and u being a function of n). Randomizing the SRS for positioning resource sequence may help avoid collisions between signals sent by neighboring UEs that receive the same UE-generic configuration information. The bandwidth field 925 may specify a total bandwidth for an SRS for positioning resource. The reference frequency field 926 indicates reference frequency (which may be called a point A) and the start PRB field 927 indicates a number of PRBs relative to the reference frequency for the beginning frequency of an SRS for positioning resource, i.e., for the first PRB of the SRS for positioning transmission. The reference frequency may be designated as subcarrier 0 for common resource block 0. The frequency hopping field 928 may indicate whether to frequency hop and if so, how (e.g., intra-slot hopping, inter-slot hopping, how many hops, size of hops, etc.). The periodicity field 929 indicates a number of subframes in which to transmit, and may be expressed in number of subframes or in time (e.g., ms). The Tx beam field 930 indicates which Tx beam the UE 803 should use for transmitting SRS for positioning. The table 900 is an example only, and other tables with other content, e.g., more or fewer fields than shown and/or with one or more of the fields 911-930 omitted and/or with one or more other fields included.

In the table 900, there are two indexes shown, each with a value in the index field 910 and each including a set of values of the fields 911-930 corresponding to (mapped to) the value of the index field 910. In this example, the values of the fields 911-930 are shown generically, with values corresponding to the index values of 8 and 12 in the index field 910 being generic values of X-8 and X-12, respectively, where X represents the various fields. For example, the transmit power for the index value 8 in the Tx power field 911 has a generic value of Tx-8 indicated.

At stage 824, the UE 803 may determine the transmission parameters for use in transmitting SRS for positioning while the UE 803 is in an unconnected or inactive state. The transmission parameters may include, for example, one or more of: a transmission beam to be used by the UE 803, a transmit power, a pilot sequence, a timing advance, a guard time, a comb number, a number of symbols per resource, an indication of a beginning frequency of a resource, a mapping of resources (e.g., frequency domain staggering, no frequency domain staggering, which symbols of slots are used for signal transmission), staggering information (e.g., whether to stagger, one or more stagger values (e.g., offset)), etc. The UE 803 may use one or more UE-generic configuration parameters received at stage 820, one or more UE-specific configuration parameters received at stage 822, information determined by the UE 803 through signal (e.g., SSB) measurements, and/or one or more other sources of information such as information received from the neighbor TRP 804 at stage 825 to determine one or more of the transmission parameters. At stage 825, the UE 803 may obtain (configuration) information from the TRP 804 for use in determining one or more transmission parameters. For example, the UE 803 may determine a pathloss reference (from DL-PRS or SSB from the TRP 804) and/or a spatial-RelationInfo value (from DL-PRS or SSB from the TRP 804). The UE 803 (e.g., the processing system 332, possibly in conjunction with the memory component 338) may use the pathloss reference to determine, or help determine, a transmit power for the SRS for positioning. The UE 803 (e.g., the processing system 332, possibly in conjunction with the memory component 338) may use the spatialRelationInfo value to determine or help determine which Tx beam to use for the SRS for positioning.

The UE 803 may determine one or more transmission parameters, e.g., for transmitting the SRS for positioning while the UE 803 is in an unconnected or inactive state, using the UE-generic parameter(s) and/or the UE-specific parameter(s). For example, the UE 803 may use any of the UE-generic parameter(s) as a default, e.g., use any available UE-generic parameter(s) even if the UE 803 has one or more corresponding UE-specific configuration parameters, to determine a transmission parameter. Thus, the UE 803 may prioritize UE-generic configuration parameters over UE-specific configuration parameters when determining transmission parameters. Alternatively, the UE 803 may use one or more UE-specific parameter(s) that the UE 803 obtained (received/determined) while connected to the TRP 802, even if the UE 803 received one or more UE-generic parameter(s) corresponding to the UE-specific parameter(s) obtained while connected. That is, the UE 803 may prioritize UE-specific configuration parameters over UE-generic configuration parameters in determining transmission parameters. The UE 803 may prioritize either a UE-generic parameter or a UE-specific parameter based on which parameter is being considered, e.g., prioritizing one or more UE-generic parameters and prioritizing one or more other UE-specific parameters. The UE 803 may, for example, use a UE-specific configuration parameter to determine a transmission parameter for which the UE 803 has no UE-generic configuration parameter (e.g., for any transmission parameter that has not been determined using UE-generic information). The processing system 332 possibly in conjunction with the memory component 338 may comprise means for determining transmission parameters based on UE-generic parameter(s) and/or UE-specific parameter(s).

The UE 803 may determine one or more of the transmission parameters in a variety of ways if the UE 803 has not obtained UE-specific configuration parameters for positioning while in the connected state. For example, the UE 803 may determine the Tx beam to use in accordance with a mapping between a received downlink reference signal, e.g., SSB and/or DL-PRS signals, to the transmission parameters. In the unconnected state, the UE 803 may measure a downlink signal and find the reception beam associated with reception of the downlink signal (e.g., the beam that receives either of these signals the best (e.g., best signal-to-noise ratio (SNR), best received power, and/or best signal-to-noise-and-interference ratio (SINR), etc.). There may be 1-to-1 mapping, many-to-1 mapping, or 1-to-many mapping. If there is 1-to-1 mapping, then the UE 803 may use the Tx beam corresponding to the Rx beam that received an SSB or DL-PRS signal. For many-to-one mapping, there are multiple DL-PRS, for example, and one SRS for positioning, and the UE 803 will use the one Tx beam available to transmit SRS for positioning if any DL-PRS is received. For one-to-many mapping, there is only one DL-PRS, for example, and the UE 803 may select an available Tx beam if a signal is received through the Rx beam. The UE 803 may send a communication, e.g., one or more PRACH sequences, to the TRP 802 to inform the TRP 802 as to which SRS for positioning resource the UE 803 selected for transmission. This may help conserve energy by having the TRP 802 avoid wasting energy listening to available SRS for positioning resources other than those used by the UE 803 (or other UE(s)) to transmit SRS for positioning resources. The information regarding the selected SRS for positioning resource may be conveyed in the MSG1, MSG3, or MSGA discussed above.

As another example, the UE 803 may determine a sequence for pilot signal transmission of the SRS for positioning. For example, the UEs may randomize a pilot sequence for SRS transmission, which may help reduce collisions between multiple UEs that receive the same broadcast (UE-generic) configuration parameters from the TRP 802 and that elect to transmit SRS for positioning based on the received, broadcast, configuration parameters. The UE 803 may, for example, use received values of the group hopping field 922 and the sequence hopping field 923 to determine a pilot sequence. The UE 803 may, as another example, randomly or pseudorandomly select one or more values of the group hopping field 922, the sequence hopping field 923, or the scrambling ID 924. The UE 803 may use the determined (e.g., received, selected) values of the sequence hopping field 923 and the scrambling ID 924 to determine the pilot sequence, e.g., in accordance with formulas provided in the 3GPP 38.214 specification, Release 16, the group hopping value being a function of the scrambling ID. The processing system 332, possibly in conjunction with the memory component 338, may comprise means for randomly or pseudorandomly selecting a pilot sequence to be used for transmitting a positioning signal.

The UE 803 may control the pilot sequence such that the sequence, once determined, does not change between symbols such that the SRS for positioning will be mapped to the same subcarriers in consecutive symbols as it is undesirable to stagger REs during unsynchronized communication. The UE 803 may transmit the SRS for positioning in a relatively large number of consecutive symbols, e.g., larger than a maximum quantity of consecutive symbols that may be used for transmission of SRS resources during connected communication between the UE 803 and the TRP 802. For example, referring also to FIG. 10, the maximum number of consecutive symbols may be 12 for a resource block of 14 symbols, and the UE 803 may transmit the SRS for positioning in the same REs (i.e., with the identical set of subcarriers, with no offset between symbols) in more than 12 consecutive symbols. In this example, the UE 803 transmits the SRS for positioning using subcarriers 1002 numbers 0, 3, 6, and 9 in 23 consecutive symbols 1004. The UE 803 may repeat a beginning portion 1006 of multiple consecutive symbols of the SRS for positioning as an end portion 1008 of the multiple consecutive symbols of the SRS for positioning so that the beginning portion 1006 of a set of multiple consecutive symbols may be used as a cyclic prefix (CP) for the end (remainder) portion 1008 of another set of multiple consecutive symbols of the SRS for positioning. For example, the beginning portion 1006 may constitute about 10% (e.g., 5%-15%) of the SRS for positioning. The processing system 332 (possibly in conjunction with the memory component 338) and the communication device 308 (in particular the transmitter 310) may comprise means for transmitting a positioning signal on an identical set of resource elements on consecutive (OFDM) symbols for more than a maximum number of consecutive symbols allowed during connected communication between the UE 803 and the communication network.

Figure 10:
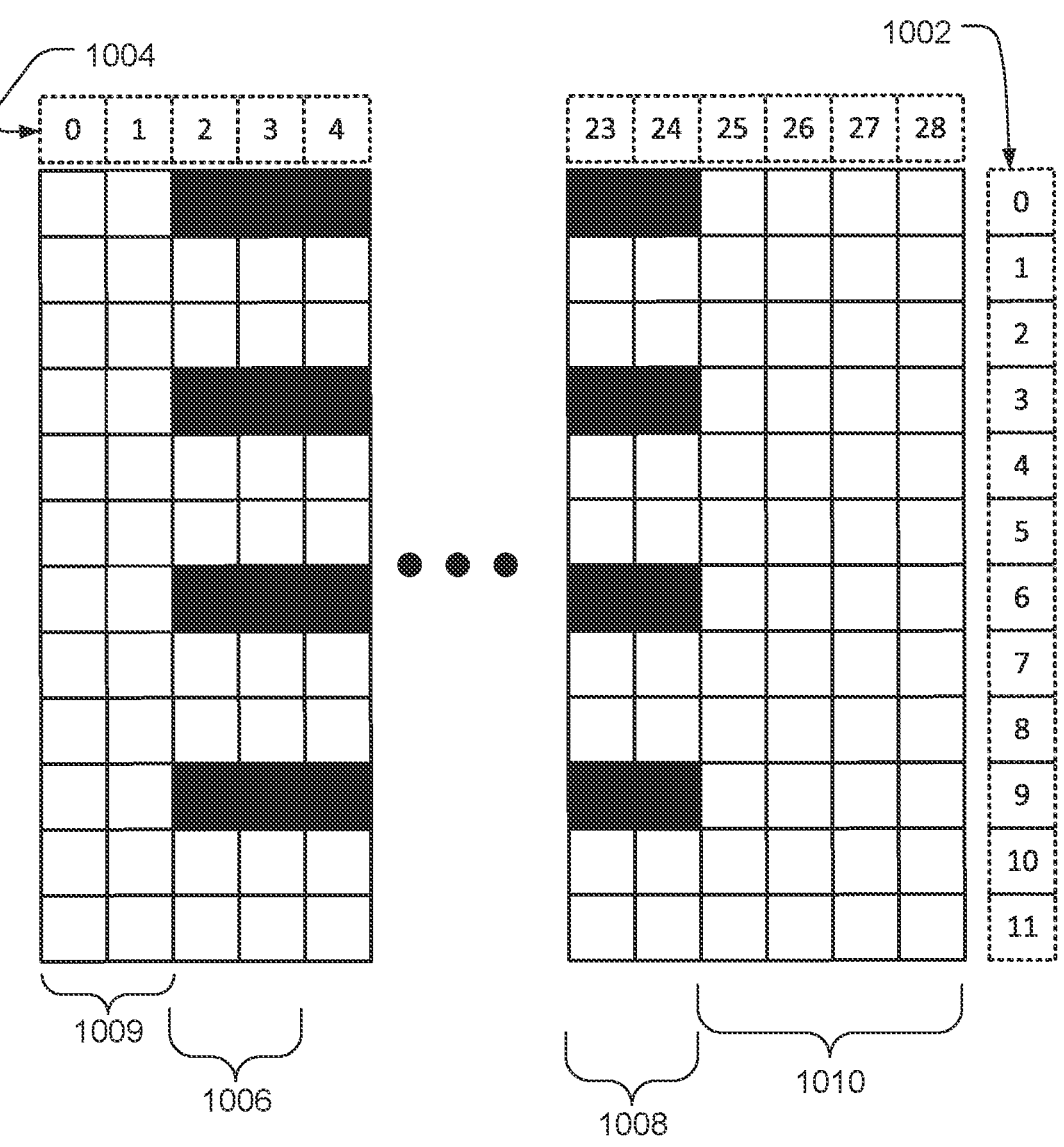
FIG. 10 is a simplified diagram of symbols used for transmitting a sounding reference signal preceded or followed by a guard interval.

As another example, the UE 803 may determine a guard (also called a guard interval) corresponding to the SRS for positioning. When the UE 803 is in an unconnected state, the UE 803 will not be synchronized with the TRP 802, and the UE 803 may send the SRS for positioning with 0 timing advance. The UE 803 may be configured to add a guard interval to the beginning and/or the end of the SRS for positioning resource which may help prevent the reception of the unsynchronized SRS for positioning from disturbing subsequent subframes for a localized UE at the edge of the TRP 802. The guard (e.g., number of guard symbols) before the beginning of a transmission may be the same as or different from the guard (e.g., number of guard symbols) after the end of the transmission. For example, as shown in FIG. 10, the UE 803 may have a guard interval 1009 of symbols 0-1 before an SRS for positioning transmission, may send an SRS for positioning in symbols 2-24, and may add a guard interval 1010 of symbols 25-28 after the SRS for positioning transmission and before sending another SRS for positioning. During the guard intervals 1009, 1010, the UE 803 will refrain from transmitting any signal in a frequency band of the SRS for positioning.

In view of the discussion above, obtaining the transmission parameters in stage 711 of the method 700 may comprise obtaining the transmission parameters in a variety of manners. For example, the obtaining may comprise receiving one or more configuration parameters from the communication network (e.g., from the TRP 802) in response to a request from the UE 803. The configuration parameter(s) may be received, while the UE 803 is in an unconnected state, from the communication network in a broadcast system information block (SIB) message that also contains downlink positioning reference signal (DL-PRS) information or in a broadcast SIB message dedicated to unconnected configuration parameters. The SIB may be a positioning-specific SIB (posSIB). The UE 803 may receive one or more UE-generic parameters while in an unconnected state and/or one or more UE-specific parameters while connected (e.g., RRC connected and DRX active mode). The UE 803 may use the UE-generic configuration parameters as a default to determine transmission parameters and use an appropriate UE-specific configuration parameter for determining any transmission parameter for which the UE has no UE-generic configuration parameter. The processing system 332, possibly in conjunction with the memory component 338 and/or the communication device 308 may comprise means for obtaining the transmission parameters, including means for receiving the configuration parameters.

At stage 826, the UE 803 sends SRS for positioning to the TRP 802. For example, the UE 803 transmits one or more SRS for positioning (i.e., one or more SRS for positioning signals) to the TRP 802 while the UE 803 is in the unconnected state or in the inactive state. The UE 803 transmits the SRS for positioning in accordance with the transmission parameters obtained as discussed above. The UE 803 may be in (e.g., enter into) an unconnected state even without having been in a connected state, e.g., in response to being powered up. The UE 803 may, for example, enter an RRC idle state or an RRC inactive state, e.g., after being in an RRC connected state. The UE 803 may enter the unconnected state before obtaining one or more of the transmission parameters.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. A statement that a feature implements, or a statement that a feature may implement, a function includes that the feature may be configured to implement the function (e.g., a statement that an item performs, or a statement that the item may perform, function X includes that the item may be configured to perform function X). Elements discussed may be components of a larger system, wherein other rules may take precedence over or otherwise modify the application of the invention. Also, a number of operations may be undertaken before, during, or after above-discussed elements or operations are considered. Accordingly, the above description does not bound the scope of the claims.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation of a processor configured to at least one of A or B means that the processor is configured to A (and may or may not be configured to B) or is configured to B (and may or may not be configured to B) or is configured to A and B, where A is a function (e.g., determine, obtain, or measure, etc.) and B is a function.

As used herein, the term RS (reference signal) may refer to one or more reference signals and may apply, as appropriate, to any form of the term RS, e.g., PRS, SRS, CSI-RS, etc.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

As used herein, unless otherwise stated, a statement that a function or operation is "based on" an item or condition means that the function or operation is based on the stated item or condition and may be based on one or more items and/or conditions in addition to the stated item or condition.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used without departing from the scope of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled unless otherwise noted. That is, they may be directly or indirectly connected to enable communication between them.

The invention claimed is:

1. A method of transmitting a sounding reference signal (SRS) for positioning, the method comprising:
    obtaining, at a user equipment (UE), a plurality of SRS transmission parameters;
    transmitting SRS for positioning from the UE in accordance with the plurality of SRS transmission parameters while the UE is in an inactive state; and
    refraining from transmitting, from the UE, the SRS for positioning during a guard interval before a beginning of transmission of the SRS for positioning.

2. The method of claim 1, further comprising receiving an indication from the communication network by the UE triggering the transmitting of the SRS for positioning from the UE.

3. The method of claim 1, wherein the inactive state comprises a discontinuous reception (DRX) inactive mode.

4. The method of claim 1, wherein the plurality of SRS transmission parameters includes a transmission beam, or a pilot sequence, or a physical resource mapping, or a timing advance, or a first guard time before transmitting of the SRS for positioning, or a second guard time after transmitting of the SRS for positioning, or a combination of two of more thereof.

5. The method of claim 1, wherein obtaining the plurality of SRS transmission parameters comprises receiving one or more configuration parameters, for transmission of sounding reference signals, from the communication network in response to a request from the UE.

6. The method of claim 1, wherein obtaining the plurality of SRS transmission parameters comprises receiving one or more configuration parameters, for transmission of sounding reference signals, from the communication network while the UE is in an unconnected state relative to the communication network.

7. The method of claim 6, wherein obtaining the plurality of SRS transmission parameters comprises receiving the one or more configuration parameters from the communication network in a broadcast system information block (SIB) message that also contains downlink positioning reference signal (DL-PRS) information.

8. The method of claim 6, wherein obtaining the plurality of SRS transmission parameters comprises receiving the one or more configuration parameters from the communication network in a broadcast system information block (SIB) message dedicated to carrying the one or more configuration parameters.

9. The method of claim 1, wherein obtaining the plurality of SRS transmission parameters comprises determining, by the UE, at least one UE-specific configuration parameter of another SRS while the UE is connected to the communication network.

10. The method of claim 9, wherein obtaining the plurality of SRS transmission parameters comprises determining each of the plurality of SRS transmission parameters based on an unconnected configuration parameter received, if at all, from the communication network by the UE while the UE is in an unconnected state relative to the communication network, or based on a connected configuration parameter received while the UE is in a connected state relative to the communication network if no appropriate unconnected configuration parameter was received.

11. The method of claim 1, wherein transmitting the SRS for positioning comprises transmitting pilot sequences on an identical set of subcarriers on consecutive OFDM (Orthogonal Frequency Division Multiplexing) symbols for more than a maximum number of consecutive OFDM symbols allowed for transmission of SRS resources for positioning during connected communication between the UE and the communication network.

12. The method of claim 11, wherein a beginning portion of a set of multiple consecutive symbols of the SRS for positioning is used as a cyclic prefix for a remainder portion of another set of multiple consecutive symbols of the SRS for positioning.

13. The method of claim 1, wherein obtaining the plurality of SRS transmission parameters comprises the UE randomly or pseudo-randomly selecting a pilot sequence to be used for transmitting the SRS for positioning.

14. The method of claim 1, wherein transmitting the SRS for positioning comprises transmitting the SRS for positioning using a transmit beam corresponding to a receive beam associated with reception of a downlink reference signal from the communication network.

15. The method of claim 14, wherein the downlink reference signal comprises an SSB (Synchronized Signal Block) or a PRS (Positioning Reference Signal).

16. A user equipment (UE) comprising:
a memory;
a transceiver; and
a processor communicatively coupled to the memory and the transceiver and configured to:
    obtain a plurality of sounding reference signal (SRS) transmission parameters; and
    transmit SRS for positioning from the UE in accordance with the plurality of SRS transmission parameters while the UE is in an inactive state;
    wherein the processor is configured to refrain from transmitting, via the transceiver, the SRS for positioning during a guard interval before a beginning of transmission of the SRS for positioning.

17. The UE of claim 16, wherein the processor is configured to transmit the SRS for positioning in response to receiving, via the transceiver, an indication from the communication network triggering transmitting of the SRS for positioning from the UE.

18. The UE of claim 16, wherein the inactive state comprises a discontinuous reception (DRX) inactive mode.

19. The UE of claim 16, wherein the plurality of SRS transmission parameters includes a transmission beam, or a pilot sequence, or a physical resource mapping, or a timing advance, or a first guard time before transmitting of the SRS for positioning, or a second guard time after transmitting of the SRS for positioning, or a combination of two of more thereof.

20. The UE of claim 16, wherein to obtain the plurality of SRS transmission parameters the processor is configured to receive one or more configuration parameters, for transmission of sounding reference signals, from the communication network in response to a request from the UE.

21. The UE of claim 16, wherein to obtain the plurality of SRS transmission parameters the processor is configured to receive one or more configuration parameters, for transmission of sounding reference signals, from the communication network while the UE is in an unconnected state relative to the communication network.

22. The UE of claim 21, wherein to obtain the plurality of SRS transmission parameters the processor is configured to receive the one or more configuration parameters from the communication network in a broadcast system information block (SIB) message that also contains downlink positioning reference signal (DL-PRS) information.

23. The UE of claim 21, wherein to obtain the plurality of SRS transmission parameters the processor is configured to receive the one or more configuration parameters from the communication network in a broadcast system information block (SIB) message dedicated to carrying the one or more configuration parameters.

24. The UE of claim 16, wherein to obtain the plurality of SRS transmission parameters the processor is configured to determine at least one UE-specific configuration parameter of another SRS while the UE is connected to the communication network.

25. The UE of claim 24, wherein to obtain the plurality of SRS transmission parameters the processor is configured to determine each of the plurality of SRS transmission parameters based on an unconnected configuration parameter received, if at all, from the communication network by the UE while the UE is in an unconnected relative to the communication network, or based on a connected configuration parameter received while the UE is in a connected state relative to the communication network if no appropriate unconnected configuration parameter was received.

26. The UE of claim 16, wherein the processor is configured to transmit the SRS for positioning by transmitting pilot sequences on an identical set of subcarriers on consecutive OFDM (Orthogonal Frequency Division Multiplexing) symbols for more than a maximum number of consecutive OFDM symbols allowed for transmission of SRS resources for positioning during connected communication between the UE and the communication network.

27. The UE of claim 26, wherein the processor is configured to use a beginning portion of multiple consecutive symbols of the SRS for positioning as a cyclic prefix for a remainder portion of another set of multiple consecutive symbols of the SRS for positioning.

28. The UE of claim 16, wherein to obtain the plurality of SRS transmission parameters the processor is configured to randomly or pseudo-randomly select a pilot sequence to be used for transmitting the SRS for positioning.

29. The UE of claim 16, wherein to transmit the SRS for positioning the processor is configured to select a transmit beam to transmit the SRS for positioning corresponding to a receive beam associated with reception of a downlink reference signal from the communication network.

30. The UE of claim 29, wherein the downlink reference signal comprises an SSB (Synchronized Signal Block) or a PRS (Positioning Reference Signal).

31. A user equipment (UE) comprising:
means for obtaining a plurality of sounding reference signal (SRS) transmission parameters; and
means for transmitting SRS for positioning in accordance with the plurality of SRS transmission parameters while the UE is in an inactive state;
wherein the means for transmitting the SRS for positioning comprises means for refraining from transmitting, from the UE, the SRS for positioning during a guard interval before a beginning of transmission of the SRS for positioning.

32. The UE of claim 31, wherein the means for transmitting the SRS for positioning are for transmitting the SRS for positioning in response to receiving an indication from the communication network triggering the transmitting of the SRS for positioning from the UE.

33. The UE of claim 31, wherein the inactive state comprises a discontinuous reception (DRX) inactive mode.

\* \* \* \* \*